(12) United States Patent
Tanaka et al.

(10) Patent No.: US 6,901,337 B2
(45) Date of Patent: May 31, 2005

(54) METHOD AND APPARATUS FOR MEASURING SIGNAL PULSE ENERGY

(75) Inventors: Eiichi Tanaka, Hamamatsu (JP); Tomohide Omura, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 161 days.

(21) Appl. No.: 10/118,331

(22) Filed: Apr. 9, 2002

(65) Prior Publication Data

US 2003/0033097 A1 Feb. 13, 2003

(30) Foreign Application Priority Data

May 28, 2001 (JP) .................................. P2001-158908

(51) Int. Cl.$^7$ ............................................. G01R 21/00
(52) U.S. Cl. .................. 702/60; 250/269.8; 250/363.07
(58) Field of Search .............................. 702/60, 66, 67, 702/69–71, 73–79, 124, 126, 189, 193; 250/269.7, 311, 363.02, 363.07, 363.09, 369, 395, 269.8; 327/33, 131

(56) References Cited

U.S. PATENT DOCUMENTS

| | | | |
|---|---|---|---|
| 3,747,001 A | * 7/1973 | Fasching et al. | ............... 327/33 |
| 4,253,154 A | * 2/1981 | Russ et al. | ................... 250/311 |
| 4,658,216 A | * 4/1987 | Goulding et al. | ........... 327/131 |
| 4,760,537 A | * 7/1988 | Martin et al. | ............... 382/100 |
| 4,922,442 A | * 5/1990 | Bolk et al. | .......... 250/363.02 |
| 5,210,423 A | * 5/1993 | Arseneau | .................... 250/369 |
| 5,225,682 A | * 7/1993 | Britton et al. | .............. 250/395 |
| 5,430,406 A | 7/1995 | Kolodziejczyk | ............ 327/336 |
| 5,459,314 A | * 10/1995 | Plasek | ...................... 250/269.7 |
| 6,160,259 A | * 12/2000 | Petrillo et al. | ......... 250/363.07 |
| 6,297,506 B1 | * 10/2001 | Young et al. | ............... 250/369 |
| 6,525,322 B2 | * 2/2003 | Wong et al. | ........... 250/363.09 |

FOREIGN PATENT DOCUMENTS

WO    WO 98/50802    11/1998

OTHER PUBLICATIONS

E. Tanaka et al.: Variable Sampling—Time Technique for Improving Count Rate Performance of Scintillation Detectors, Nucl. Instr. Meth., vol. 158, pp. 459–466, 1979.

Karp et al.: Event localization in a continuous scintillation detector using digital processing, IEEE Trans. Nucl. Sci., vol. 33, No. 1, Feb. 1986.

Li et al: A high speed position–decoding electronics for BGO block detectors in PET, 1999 IEEE Medical Imaging Conf. Record M3–40, Jun. 2000.

E. Tanaka et al.: A new method for preventing pulse pileup in scintillation detectors Physics in Medicine and Biology. 327–39, 2002.

(Continued)

*Primary Examiner*—Marc S. Hoff
*Assistant Examiner*—Mohamed Charioui
(74) *Attorney, Agent, or Firm*—Morgan, Lewis & Bockius LLP

(57) ABSTRACT

The energy E of a signal pulse P inputted to an energy measurement apparatus 1 for measurement, and corresponding to the total integrated intensity, is calculated in an energy calculation unit 10 from the integrated signal intensity Q acquired by a gate integrator 32, and from the pulse interval T measured by a pulse interval measurement unit 23. At this time, pileup correction is performed using at least one of the integrated signal intensity or the energy, and the pulse interval of the signal pulse inputted prior to the signal pulse for measurement. By this means, the correct energy E, with the effect of pileup eliminated, can be determined with good precision. Hence a method and apparatus for energy measurement are realized which enable correct and precise measurement of the energy of individual signal pulses, even when the pulse interval between signal pulses is short.

19 Claims, 21 Drawing Sheets

OTHER PUBLICATIONS

E. Tanaka et al.: new anger scintillation cameras with improved count rate capability, *Radiosotopes.*, 29 320–5, 1980.

Wong et al.: A scintillation detector signal processing technique with active pileup prevention for extending scintillation count rates, *IEEE Trans. Nucl. Sci.* vol. 45, pp. 838–842, Jun. 1998.

Wong et al.: A high count rate position decoding and energy measuring method for nuclear cameras using anger logic detectors, *IEEE Trans. Nucl. Sci.* vol. 45, pp. 1122–1127, Jun. 1998.

\* cited by examiner

METHOD AND APPARATUS FOR MEASURING SIGNAL PULSE ENERGY

BACKGROUND OF THE INVENTION

1. Field of the Invention

This invention relates to a method and apparatus for measuring the energy of a signal pulse, by integrating the signal intensity of the pulse waveform of the input signal pulse. This invention is widely used not only in measurements of the energy of radiation and in dosimetry, but in measurement of radiation detection positions, radiation images and other areas, and in particular is applied in gamma cameras used in nuclear medical diagnostics, in SPECT (Single Photon Emission Computed Tomography) systems, and in PET (Positron Emission Tomography) systems.

2. Description of the Related Art

When performing measurements of γ rays, charged particle beams and other radiation (energy beams), a scintillation detector using a scintillator, or some other radiation detector is used. The detection signal output from the radiation detector is subjected to prescribed signal processing or to other processing to obtain the required information.

For example, using a scintillation detector, radiation incident on the scintillator is detected through the scintillation light pulses occurring in the scintillator. Optical signal pulses resulting from this scintillation light are converted into electrical signal pulses by a photomultiplier tube or other photodetector. That is, when the scintillation light is incident on the photoelectric surface of a photomultiplier tube, a plurality of photoelectrons are generated from the photoelectric surface, in proportion to the light intensity; after these photoelectrons are collected by a first dynode, the electrical signal is amplified by successive dynodes in sequence, and output as a pulse signal (electrical current signal).

In general, the scintillation light of a scintillator used in a radiation detector has a pulse waveform, with the signal intensity being attenuated exponentially, for example. The total number of photoelectrons collected by the first dynode corresponds to the energy of the radiation absorbed by the scintillator. Hence in order to measure the energy of the radiation, the output signal from a photomultiplier tube must be integrated over an appropriate time interval. In general, the total number of photoelectrons collected by the first dynode as a result of one signal pulse is not sufficiently large, and so it is preferable that the above integration time be set so as to integrate most of the scintillation light. If the integration time is short, the number of photoelectrons collected is decreased, and so the energy resolution is degraded due to statistical fluctuations.

If measurements are performed in a state in which the number of detections (count rate) of radiation per unit time by the radiation detector is high, then the probability is increased that the pulse interval between signal pulses will be approximately the same as, or shorter than, the pulse width of individual pulses, so that so-called "pileups" in which two or more signal pulses overlap temporally occur. At such times, if the signal intensity (current signal) of a signal pulse the energy of which is to be measured is integrated, the signal intensity of another signal pulse with which the signal pulse has piled-up is simultaneously integrated, and so there arises the problem that the energy of the signal pulse being measured cannot be accurately measured.

When a pulse waveform is represented by a single exponential function, a comparatively simple method which is conventionally used to reduce the error due to pileups involves shortening the time width of pulses using the delay line clipping method, and setting the integration time to be approximately equal to the pulse time width. In this case, the shorter the pulse time width is made, the more the integration time can be shortened, so that the probability of occurrence of pileups is decreased at high count rates, and the count rate characteristic can be improved. On the other hand, the number of photoelectrons collected at the first dynode of the photomultiplier tube for each signal pulse is reduced, and so there is the drawback that even at low count rates at which pileups do not occur, the energy resolution is lowered.

As prior art which improves on this, in the method of Tanaka et al (reference 1: Nucl. Instr. Meth. Vol. 158, pp. 459–466, 1979), the pulse time width is shortened by a delay line clipping method like that above, but by controlling the integration time through the occurrence of the succeeding pulse, so that the integration time is sufficiently long within the range in which the succeeding pulse does not occur, a lowering in energy resolution at low count rates is avoided.

In the method of Kolodziejczyk (reference 2: U.S. Pat. No. 5,430,406), by adding the pulse signal (current signal) and the integration signal obtained by time integration of this, with appropriate weighting, an addition signal is generated which is constant in time and the amplitude of which is proportional to the energy; measurements are performed by sampling the amplitude of this addition signal. The addition signal of the signal pulse for measurement is sampled immediately before the arrival of the succeeding signal pulse; by measuring this value, the effect of pileups of succeeding signal pulses can be eliminated, but the effect of pileups of preceding signal pulses cannot be eliminated.

Still another method is that of Wong (reference 3: International Patent WO98/50802). Similarly to Kolodziejczyk's method described above, this method employs a technique in which an addition signal obtained from the current signal and an integration signal is measured, but is improved so as to correct for the effect of all signal pulses arriving before the signal pulse being measured.

SUMMARY OF THE INVENTION

When using a scintillation detector or other radiation detector to measure radiation, if the count rate is high and signal pulse pileups occur, errors arise in measured energy values, and the energy resolution declines. If signal pulse pileups occur in a gamma camera, SPECT system, PET system or other radiation image measurement system using a scintillation detector, not only the radiation energy, but the position signal indicating the detected position of radiation cannot be measured correctly, so that the resolution of the obtained radiation image may decline, and distortions may appear in the image. These problems at high count rates can be prevented to some extent using conventional pileup correction methods, but these methods have been inadequate.

That is, in the method described above in which pulse widths are shortened using delay line clipping, there is the drawback that energy resolution and image resolution are lowered even at low count rates at which pileup does not occur. In the method of Tanaka et al also, if pulse widths are made extremely short in order to enable measurement up to high count rates, the resolution at high count rates is reduced. In the method of Kolodziejczyk and the method of Wong, in which the current signal is added to the integrated signal with appropriate weighting applied, because the current signals of signal pulses undergo prominent statistical fluctuations with the passage of time, there is the drawback that the energy resolution and image resolution are greatly reduced as the count rate increased. Also, these methods have the further drawback that they can be applied only in cases in which scintillation pulse waveforms can be approximated by a single exponential function; in other cases, for example when pulse waveforms are approximated by the sum of two or more exponential functions with different attenuation constants, they cannot be applied.

The present invention was devised in order to resolve the above problems, and has as objects the provision of a method and apparatus for measuring signal pulse energy which are capable of accurately and precisely measuring the energies of individual signal pulses even at high count rates, and improvement of the performance of radiation measurement and radiation image measurement.

In order to attain these objects, the energy measurement method of this invention is an energy measurement method, in which the signal intensity of the pulse waveform of a signal pulse for measurement is integrated and the energy of the signal pulse is measured, comprising (1) a pulse interval acquisition step, in which the pulse interval of the inputted signal pulse, which is the time interval from the signal pulse to the next signal pulse, is acquired; (2) an integrated intensity acquisition step, in which the signal intensity of the signal pulse is integrated over a prescribed integration time set so as to correspond to the pulse interval, to acquire the integrated signal intensity; and, (3) an energy calculation step, in which the energy corresponding to the total integrated intensity of the signal pulse is calculated from the integrated signal intensity acquired in the integrated intensity acquisition step, and from the pulse interval acquired in the pulse interval acquisition step; and wherein (4) in the energy calculation step, pileup correction of the uncorrected energy calculated from the integrated signal intensity and the pulse interval for the signal pulse to be measured is performed, using at least one of the integrated signal intensity or the energy, and the pulse interval, for the signal pulse inputted prior to the signal pulse for measurement to calculate the corrected energy.

Also, an energy measurement apparatus of this invention is an energy measurement apparatus which integrates the signal intensity of the pulse waveform of a signal pulse for measurement to measure the energy of the signal pulse, comprising (a) trigger signal generation means, which accepts as input one of the branched signal pulses of the inputted signal pulse and generates a trigger signal corresponding to the signal pulse; (b) gate signal generation means, which accepts as input the trigger signal from the trigger signal generation means, and based on the trigger signal, generates a gate signal to indicate integration of the signal intensity; (c) pulse interval measurement means, which accepts as input the trigger signal from the trigger signal generation means, and measures the time interval from the trigger signal until the next trigger signal as the pulse interval of the signal pulse; (d) delay means, which accepts as input the other of the inputted branched signal pulses, and delays the signal pulse by a prescribed delay time; (e) gate integration means, which accepts as input the signal pulse delayed by the delay means and the gate signal from the gate signal generation means, and integrates the signal intensity of the signal pulse for a prescribed integration time which is set based on the indication of the gate signal, to acquire the integrated signal intensity; and, (f) energy calculation means, which calculates the energy corresponding to the total integrated intensity of the signal pulse from the integrated signal intensity acquired by the gate integration means and from the pulse interval measured by the pulse interval measurement means; and wherein (g) the energy calculation means performs pileup correction of the uncorrected energy calculated from the integrated signal intensity and the pulse interval of the signal pulse for measurement, using at least one of the integrated signal intensity or the energy, and the pulse interval, of the signal pulse inputted prior to the signal pulse for measurement to calculate the corrected energy.

In the above method and apparatus for energy measurement, the energy is determined from the time change of the pulse waveform, that is, of the signal intensity (current signal) of the input signal pulse for measurement; in addition, the data previously acquired for another signal pulse input preceding the signal pulse to be measured is used to perform pileup correction. In this way, the effect of other signal pulses which have piled-up with the signal pulse to be measured can be eliminated, and so the energy of individual signal pulses can be measured correctly.

As the data used in calculation of the uncorrected energy of the signal pulse and in pileup correction, instead of directly using the signal pulse (current signal), which is considerably affected by noise and other factors, the integrated signal intensity, pulse interval, and the energy calculated from these are used. In this way, the signal pulse energy can be measured with good precision. Thus a method and apparatus for energy measurement is realized which makes possible the correct and precise measurement of the energy of individual pulses, even when the pulse interval between signal pulses is short and pileup occurs among signal pulses.

In this specification, the "signal pulse energy" refers to the total integrated intensity of a signal pulse to be measured, obtained by integrating the signal intensity over the entire pulse waveform. This corresponds to the integrated signal intensity when the integration time is made infinitely long.

DESCRIPTION OF THE PREFERRED EMBODIMENTS

Below, preferred embodiments of the method and apparatus for energy measurement of this invention are explained in detail, together with the drawings. In explaining the drawings, elements are assigned the same symbols, and redundant explanations are omitted.

Figure 1:
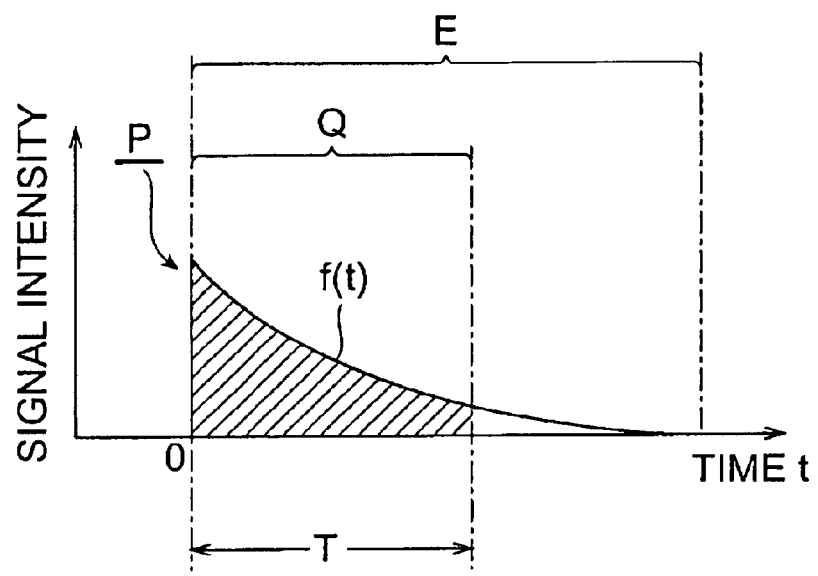
FIG. 1 is a graph which shows schematically an example of the pulse waveform of a signal pulse for energy measurement.
Figure 2A:
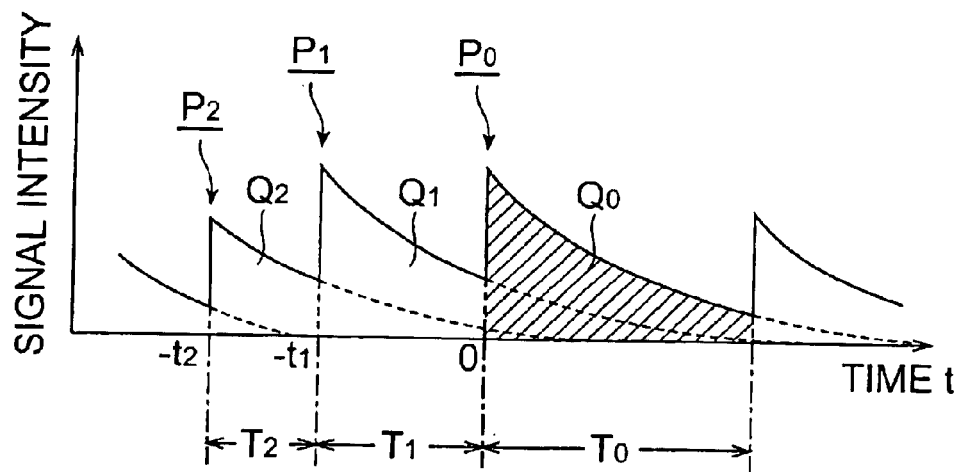
FIG. 2A and FIG. 2B are graphs showing the occurrence of signal pulse pileups.
Figure 2B:
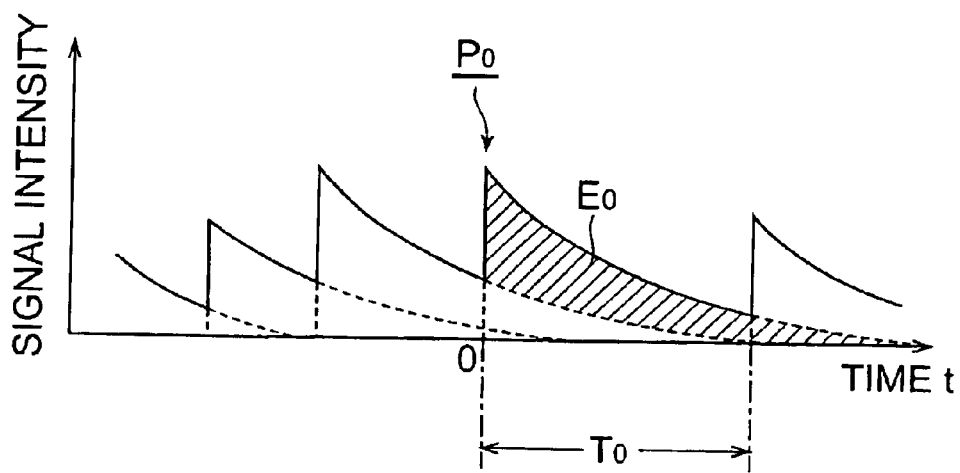

As examples of signal pulses for measurement by the method and apparatus for energy measurement of this invention, the graphs of time domain waveforms of FIG. 1, FIG. 2A and FIG. 2B are used to explain signal pulses output as detection signals from a scintillation detector used as a radiation detector.

FIG. 1 is a graph which schematically shows one example of the time domain waveform (current signal waveform) of the signal intensity, which is the pulse waveform, of a signal pulse output from a scintillation detector as corresponding to radiation detection. In this graph, the horizontal axis indicates the time t, and the vertical axis indicates the signal intensity (current value) of the signal pulse at each time.

In the scintillation detector, an electrical signal pulse P is output from the photodetector connected to the scintillator according to the light signal pulse due to the scintillation light generated within the scintillator. This signal pulse P generally has a pulse waveform such that the signal intensity, which rises at a time corresponding to the time of scintillation light generation, is attenuated with a certain spreading in time, extending over a certain pulse time width.

Specifically, the pulse waveform of the signal pulse P exhibits a pulse waveform which can, for example, be approximated as shown in FIG. 1 by a signal intensity which rises at the time of the leading edge, and then has a time domain waveform f(t) which is attenuated according to a single exponential function with the passage of time t.

$$f(t)=(E/\tau)exp(-t/\tau). \qquad (1)$$

In eq. (1), $\tau$ is the time constant for attenuation of the signal intensity in the pulse waveform of the signal pulse P, and t indicates the time elapsed from the leading edge of the signal pulse P. E is the energy of the signal pulse P corresponding to the total integrated intensity of the signal intensity of the pulse waveform.

In this specification, the energy of the signal pulse refers to the total integrated intensity of the pulse waveform of the signal pulse for measurement, obtained by integrating the signal intensity over its entirety. This is equivalent to the integrated signal intensity in the case in which the integration time is made infinitely long.

When measuring the energy E of a signal pulse P, the desired integration time is set according to the pulse width and attenuation time constant $\tau$ of the signal pulse P, and the signal intensity of the pulse waveform f(t) is integrated over the integration time thus set. If the integration time for integrating the signal intensity starting from the leading edge of the signal pulse P is T, then the integrated signal intensity Q(T), which is the integrated charge amount thus obtained, is expressed by $$Q(T) = \int_0^T f(t)dt = E\{1 - exp(-T/\tau)\}. \qquad (2)$$

This integrated signal intensity Q(T) is equivalent to the integrated value of the signal intensity over the range indicated by the shading in FIG. 1; as the integration time T is lengthened, the integrated signal intensity approaches the energy E of the signal pulse P, which is the total integrated intensity. If, for convenience in expression, the integration response G(T) is defined as $$G(T)=1-exp(-T/\tau) \qquad (3)$$

then the integrated signal intensity of eq. (2) becomes Q(T)=EG(T).

FIG. 2A and FIG. 2B are graphs showing the occurrence of signal pulse pileups. Such signal pulse pileups occur when, for example, the number of detections (count rate) per unit time of radiation in the scintillation detector is high, and the pulse time interval between signal pulses is short. In other words, when the pulse interval between signal pulses becomes substantially the same as or shorter than the pulse widths of individual signal pulses, pileups occur, in which the pulse waveforms of two or more signal pulses P overlap, as shown in the graph of time domain waveforms of FIG. 2A.

In the graph of FIG. 2A, the two signal pulses $P_1$, $P_2$ continuously preceding the signal pulse $P_0$, shown as the signal pulse the energy of which is to be measured, are shown with pulse waveforms similar to the pulse waveform of the signal pulse $P_0$. These signal pulses $P_1$ and $P_2$ are both piled-up with the signal pulse $P_0$ which is to be measured.

Here, if the time at the leading edge of the signal pulse $P_0$ is 0, then the times at the leading edge of the signal pulse $P_1$ is taken to be $-t_1$, and the time at the leading edge of the signal pulse $P_2$ is taken to be $-t_2$ ($-t_2 < -t_1 < 0$), as shown in FIG. 2A. Also, the pulse interval from the signal pulse for measurement to the next signal pulse is assumed to be $T_2$ at the signal pulse $P_2$, $T_1$ at the signal pulse $P_1$, and $T_0$ at the signal pulse $P_0$.

Suppose that, for the pulse waveforms of each of these signal pulses $P_i$ (i=2,1,0), integration of the signal intensity is performed, taking as the integration time the pulse interval $T_i$ until the next signal pulse. Then the integrated signal intensity $Q_0(T_0)$ resulting from integration over the integration time $T_0$ is obtained as the integrated signal intensity for the signal pulse $P_0$ (the integration value over the range indicated by shading in FIG. 2A). Similarly, integrated signal intensities $Q_1(T_1)$, $Q_2(T_2)$ resulting from integrating over the integration times $T_1$, $T_2$ are obtained as the integrated signal intensities of the signal pulses $P_1$, $P_2$.

The energy $E_0$ of the signal pulse $P_0$ to be measured is equivalent to the integrated signal intensity, resulting from integration of the entirety of the signal intensity contained in the pulse waveform of the signal pulse $P_0$, as shown by the shading in FIG. 2B. If the frequency of signal pulses is low and pileup does not occur, then if the pulse waveform f(t) of the signal pulse to be measured is known, the above eq. (2) can be used to calculate the energy $E_0 = Q_0/G(T_0)$ of the signal pulse $P_0$ from the integrated signal intensity $Q_0$ and the pulse interval $T_0$ which is the integration time.

On the other hand, when signal pulse pileups occur, the integrated signal intensity $Q_0$ actually obtained for a signal pulse $P_0$ includes, in addition to the integration value of the signal intensity for the signal pulse $P_0$ itself, the integration values of the signal intensity for the other signal pulses $P_1$, $P_2$ which precede the signal pulse $P_0$ and are piled-up with the signal pulse $P_0$, as shown in FIG. 2A. Here the integrated signal intensity $Q_0$ does not correspond directly to the signal intensity of the signal pulse $P_0$ or to the energy $E_0$ which is the total integrated intensity. Hence if this integrated signal intensity $Q_0$ is used without modification, the energy $E_0$ of the signal pulse $P_0$ cannot be measured correctly.

Thus when signal pulse pileup occurs, in order to correctly measure the energy E of a signal pulse P, when calculating the energy E pileup correction must be performed, in which the effect of other signal pulses which are piled-up with the signal pulse P being measured is eliminated.

The method and apparatus for energy measurement of this invention enable the correct and precise measurement of the energy of individual signal pulses even when pileup of signal pulses occurs; by using a prescribed method and configuration to perform such pileup correction.

Figure 3:
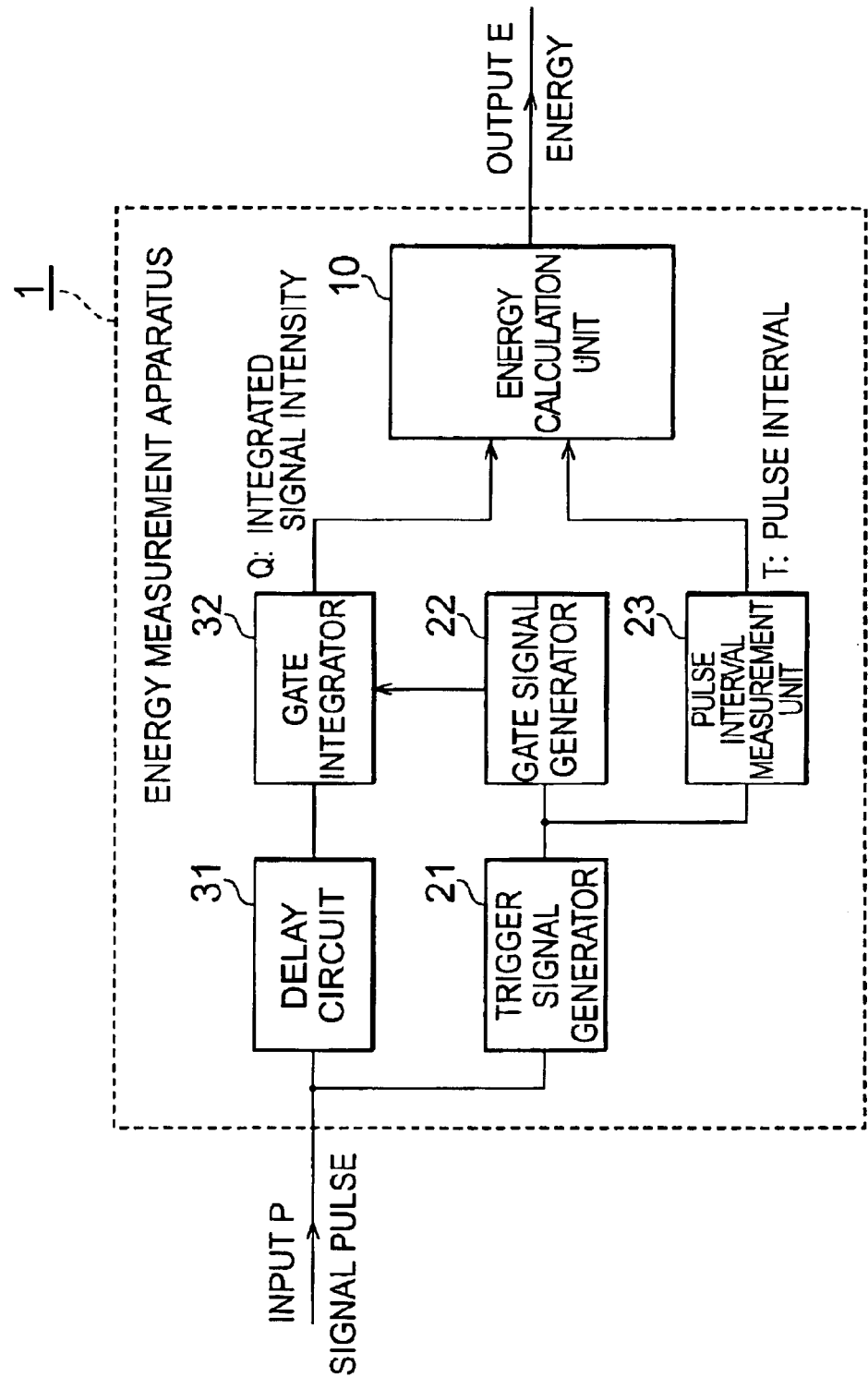
FIG. 3 is a block diagram showing the configuration of a first embodiment of an energy measurement apparatus.

FIG. 3 is a block diagram showing the configuration of a first embodiment of an energy measurement apparatus of this invention. The energy measurement apparatus 1 is an energy measurement circuit (signal processing circuit) which measures the energy E of a signal pulse P by integrating the signal intensity of the pulse waveform of a signal pulse P input for measurement, and comprises an energy calculation unit 10 which performs operations and similar to calculate the energy E of the signal pulse P.

The signal pulse P for energy measurement, which is for example the electrical signal pulse which is a detection signal from a scintillation detector as shown in FIG. 1, FIG. 2A, and FIG. 2B, is input to the energy measurement apparatus 1, and is branched into two signal pulses.

One of the branched signal pulses is input to the trigger signal generator 21. The trigger signal generator 21 generates a trigger signal corresponding to the signal pulse P. Specifically, for example, a threshold is set in advance as the lower limit of the signal intensity for the pulse waveform of the input signal pulse P, and when the signal intensity of the signal pulse P exceeds the threshold, a trigger signal corresponding to the signal pulse P is generated and output.

The trigger signal output from the trigger signal generator 21 is input to the gate signal generator 22 and pulse interval measurement unit 23. The gate signal generator 22 generates a gate signal to instruct integration (for example, to instruct that integration be started or stopped) of the signal intensity of the signal pulse P, based on the trigger signal. The pulse interval measurement unit 23 measures the time interval from the trigger signal until the next trigger signal, taking T as the pulse interval from the signal pulse P to be measured until the next signal pulse.

On the other hand, the other branched signal pulse is input to the delay circuit 31. The delay circuit 31 delays the input signal pulse P by a prescribed delay time before output, in order to perform integration of the signal intensity based on instruction by the gate signal.

The signal pulse P thus delayed by the delay circuit 31 is input to the gate integrator 32. A gate signal from the gate signal generator 22 is also input to the gate integrator 32. The gate integrator 32 performs integration of the signal intensity of the signal pulse P input from the delay circuit 31, for a prescribed integration time set based on the instruction of this gate signal, and outputs the integrated signal intensity Q thus obtained.

The integrated signal intensity Q obtained by the above gate integrator 32, and the pulse interval T measured by the pulse interval measurement unit 23, are input to the energy calculation unit 10 which calculates the energy E of the signal pulse P. The energy calculation unit 10 calculates the energy E corresponding to the total integrated intensity of the signal pulse P from the integrated signal intensity Q and pulse interval T, while performing pileup correction so as to eliminate the influence of other signal pulses which have piled-up with the signal pulse P.

The method of measuring the energy of the signal pulse P executed by the energy measurement apparatus 1 of this embodiment may be summarized as follows (cf. FIG. 2A).

First, the pulse interval $T_0$ from a signal pulse $P_0$, input to the energy measurement apparatus 1 for measurement, to the next signal pulse, is acquired in the pulse interval measurement unit 23 (pulse interval acquisition step). Also, the integrated signal intensity $Q_0$ is acquired by the gate integrator 32 by integrating the signal intensity of the signal pulse $P_0$ over a prescribed integration time, set so as to correspond to the pulse interval $T_0$ based on the instruction of a gate signal (integrated intensity acquisition step).

The energy $E_0$ of the signal pulse $P_0$ is then calculated in the energy calculation unit 10 from this integrated signal intensity $Q_0$ and pulse interval $T_0$ (energy calculation step).

At this time, pileup correction is performed on the uncorrected energy calculated from the integrated signal intensity $Q_0$ and pulse interval $T_0$ for the signal pulse $P_0$ to be measured, using a pulse interval (for example, the pulse interval $T_1$), and either an integrated signal intensity (for example, the integrated signal intensity $Q_1$) or an energy (for example, the energy $E_1$), or both, previously acquired, for a signal pulse input before the signal pulse $P_0$ (for example, the signal pulse $P_1$). By this means, a corrected energy $E_0$ is calculated in which the effect of other signal pulses piled-up on the signal pulse $P_0$ is greatly eliminated, and is output from the energy measurement apparatus 1.

Below the advantageous results of the above-described method and apparatus for energy measurement are explained.

In the method and the apparatus 1 for energy measurement of this embodiment, the energy E of the input signal pulse P for measurement is determined from the pulse waveform, that is, from the time change in the signal intensity, and in addition data acquired previously for other signal pulses input before the signal pulse P is used to perform pileup correction. By this means, the effect of other signal pulses which have piled-up on the signal pulse P is eliminated, and the energy E of individual signal pulses P can be correctly measured.

As data used in calculation of the energy of the signal pulse P prior to correction and in pileup correction, instead of directly using the signal intensity of the signal pulse P, which is greatly influenced by the noise signal arising in the signal pulse P and other factors, the integrated signal intensity Q obtained by integration of the signal intensity by the gate integrator 32, the pulse interval T measured by the pulse interval measurement unit 23, and the energy E calculated from these, are used in energy calculations. By this means, the energy E of the signal pulse P can be measured with good precision.

Thus a method and apparatus for energy measurement is realized which are capable of the correct and precise measurement of the energies of individual signal pulses, even when the pulse interval between signal pulses is short, and pileups occur between signal pulses. Such a method is not limited to cases in which the pulse waveforms of signal pulses are expressed by a single exponential function, but can be applied to a wide range of more general time domain waveforms.

Various devices may be used as necessary as the respective circuit elements comprised by the energy measurement apparatus 1. For integration of the signal intensity by the gate integrator 32, analog operation may be used to integrate the current signal; or, after continuous sampling to digitize the signal waveform, digital operation may be employed for integration. In measurement of pulse intervals by the pulse interval measurement unit 23, a method can be used in which a clock pulse is for example be input to the pulse interval measurement unit 23, so that by counting the number of clock pulses, the time interval is measured.

Below a more specific explanation of the configuration of the energy measurement apparatus, and of the energy measurement method including the method of energy calculation executed by the measurement apparatus, is given.

Figure 4:
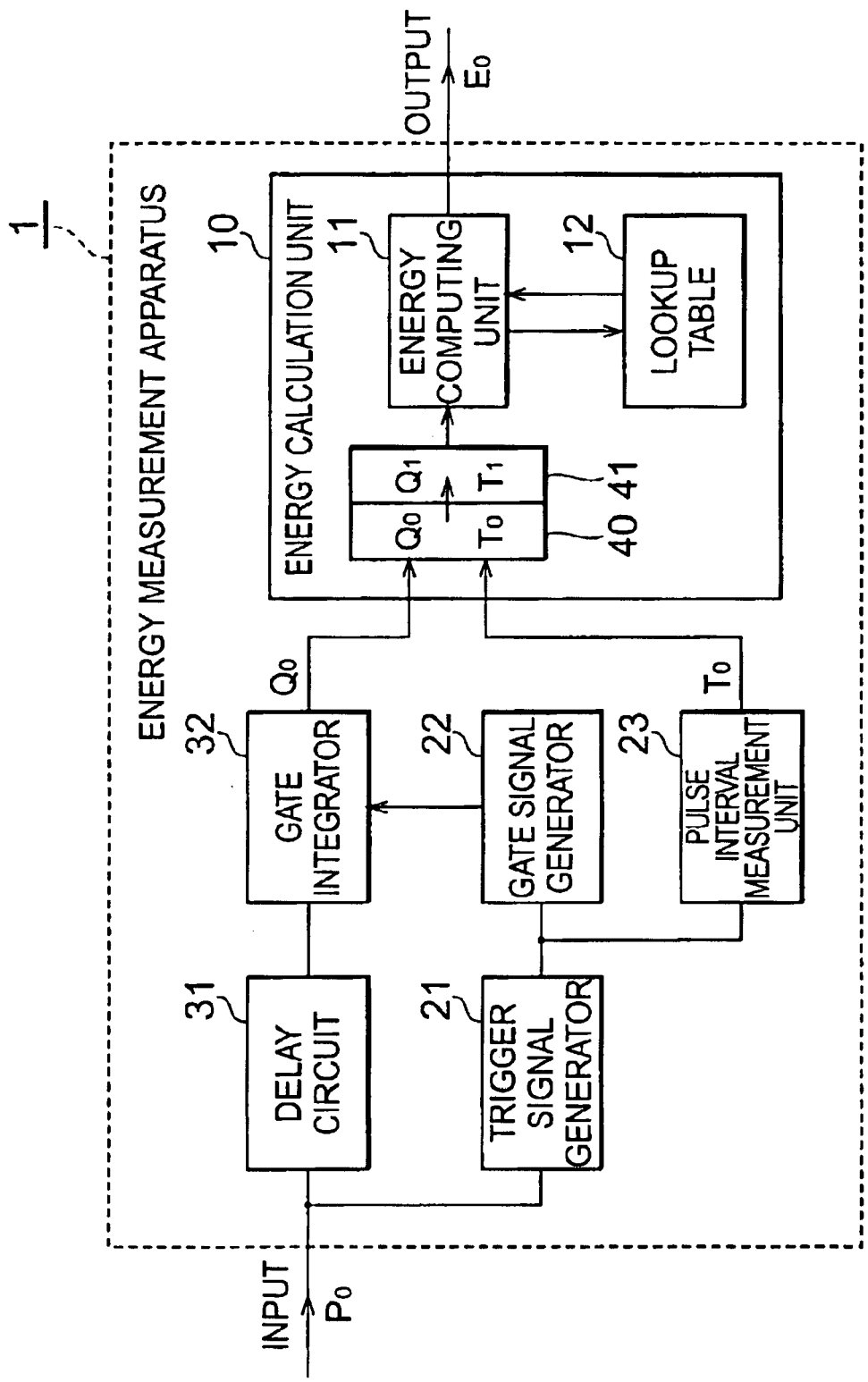
FIG. 4 is a block diagram showing the configuration of a second embodiment of an energy measurement apparatus.

FIG. 4 is a block diagram showing the configuration of a second embodiment of the energy measurement apparatus. This energy measurement apparatus 1 is configured to enable application to measurement of the energy of a signal pulse when the pulse waveform of the signal pulse P for measurement can be represented, for example, by a single exponential function, as shown for example in FIG. 1, FIG. 2A and FIG. 2B.

The energy measurement apparatus 1 of this embodiment is similar to the embodiment shown in FIG. 3 with respect to the trigger signal generator 21, gate signal generator 22, pulse interval measurement unit 23, delay circuit 31, and gate integrator 32.

The energy calculation unit 10 in this embodiment has an energy computing unit 11, lookup table 12, and two buffer memories 40, 41. The energy computing unit 11 performs computations necessary to calculate the energy $E_0$ corresponding to the input signal pulse $P_0$ to be measured. As explained below, the lookup table 12 stores coefficient data used in computations executed by the energy computing unit 11.

The buffer memory 40 stores an integrated signal intensity $Q_0$ input from the gate integrator 32 and a pulse interval $T_0$ input from the pulse interval measurement unit 23, in association with the signal pulse $P_0$ which is to be measured at each moment. The buffer memory 41 stores the integrated signal intensity $Q_1$ and pulse interval $T_1$ of the signal pulse $P_1$ preceding the signal pulse $P_0$. Each of these data sets is data input for computations by the energy computing unit 11 to calculate the energy.

By thus configuring an energy calculation unit 10 having an energy computing unit 11 which performs computations in order to calculate the energy $E_0$, a buffer memory 40 (first buffer memory) which stores the integrated signal intensity $Q_0$ and pulse interval $T_0$ of the signal pulse $P_0$ to be measured, and a buffer memory 41 (second buffer memory) which stores the integrated signal intensity $Q_1$ and pulse interval $T_1$ of the signal pulse $P_1$ preceding the signal pulse $P_0$, computations to calculate the energy E can be reliably performed, while referring to the data stored in the buffer memories.

Below is explained the single exponential function correction method, which is a method for calculation of the energy E which can be applied to cases in which the pulse waveform of the signal pulse P is expressed by a single exponential function such as the time domain waveform f(t) in eq. (1), referring to the energy measurement apparatus shown in FIG. 4 and in particular to the configuration of the energy calculation unit 10.

When the pulse waveform of the signal pulse $P_0$ is expressed by the time domain waveform f(t) of eq. (1), if it is supposed that pileup of signal pulses does not occur, then the integrated signal intensity $Q_0$, obtained by integrating the signal intensity with the pulse interval $T_0$ as the integration time, is $$Q_0 = E_0\{1-exp(-T_0/\tau)\} = E_0 G(T_0). \qquad (4)$$

Here the energy $E_0$ of the signal pulse $P_0$ is calculated from the integrated signal intensity $Q_0$ and pulse interval $T_0$ stored in the buffer memory 40 using $$E_0 = \frac{Q_0}{G(T_0)}. \qquad (5)$$

On the other hand, when pileup of signal pulses occurs, the integrated signal intensity $Q_0$ includes the integrated signal intensities of signal pulses $P_1$, $P_2$, and similar preceding the signal pulse $P_0$. Hence in order to correctly determine the energy $E_0$, pileup correction, in which the integrated signal intensities of the signal pulses $P_1$, $P_2$ and similar are eliminated from the right-hand side $Q_0/G(T_0)$ in eq. (5), must be performed. When pulse waveforms are a single exponential function, the integrated signal intensities to be removed can be determined from the integrated signal intensity $Q_1$ and pulse interval $T_1$ stored in the buffer memory 41 as data previously acquired for the signal pulse $P_1$ immediately preceding the signal pulse $P_0$ being measured.

From the above, in a single exponential function correction method, the pileup-corrected energy $E_0$ of a signal pulse $P_0$ can be calculated using the following eq. (6) from the integrated signal intensity $Q_0$ and pulse interval $T_0$ stored in the buffer memory 40, and the integrated signal intensity $Q_1$ and pulse interval $T_1$ stored in the buffer memory 41.

$$E_0 = \frac{Q_0}{G(T_0)} - Q_1 \frac{\exp(-T_1/\tau)}{G(T_1)}. \tag{6}$$

In the above eq. (6), the pulse interval $T_i$ until the next signal pulse is used without modification as the integration time for integrating the signal intensity of each signal pulse $P_i$. In actuality, however, the integration time must be set taking into account the fact that some time is required to read and reset integration values in the gate integrator 32. Also, it is preferable that a maximum integration time be set as an upper limit on the integration time, in order that integration of signal intensity is not performed over a long period of time when the pulse interval $T_i$ is long.

If the reset time required for reading and reset of an integration value in the gate integrator 32 is $T_r$, and the maximum integration time set is $T_{max}$, then the effective integration time T' for actual integration of the signal intensity as a function of the pulse interval T of the signal pulse P is:

$$T' = \min(T_{max}, T - T_r). \tag{7}$$

Figure 5A:
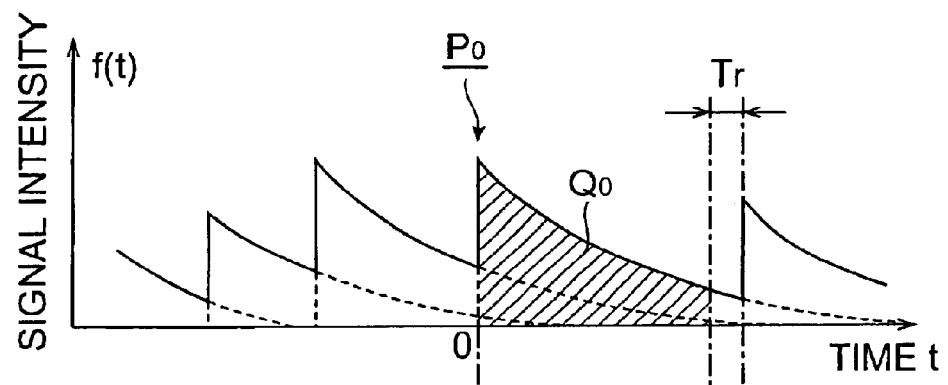
FIG. 5A and FIG. 5B are graphs showing the pulse interval and effective integration time for the pulse waveform of signal pulses.
Figure 5B:
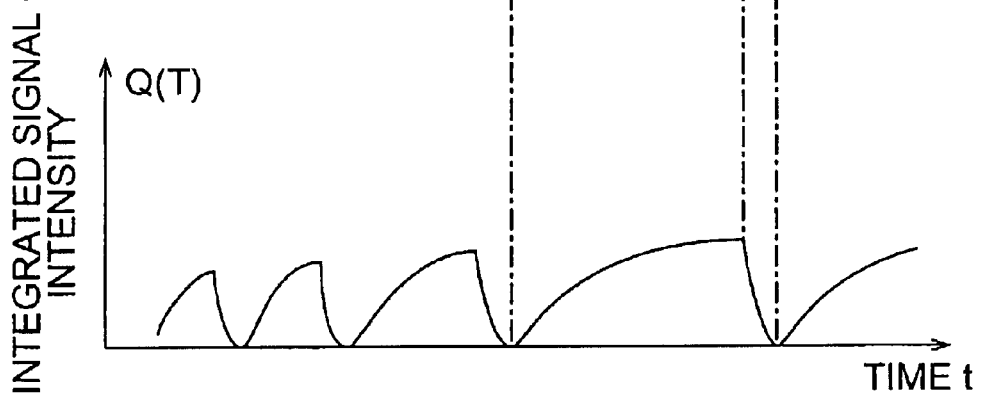

FIG. 5A and FIG. 5B are graphs showing the pulse interval T and effective integration time T' for the pulse waveform of the signal pulse P. Similarly to FIG. 2A, the graph of FIG. 5A shows the signal waveform, which is the change with time in the signal intensity. The graph of FIG. 5B shows the integrated waveform, which is the change in time of the integrated signal waveform, obtained by integrating the signal waveform shown in FIG. 5A.

In FIG. 5A and FIG. 5B, as an example, a case is shown in which the pulse interval $T_0$ for the signal pulse $P_0$ satisfies the relation with the maximum integration time $T_{max}$ of $T_0 - T_r < T_{max}$. Here the effective integration time $T_0'$ for the pulse interval $T_0$ of the signal pulse $P_0$ is $T_0' = T_0 - T_r$. The integrated signal intensity output from the gate integrator 32 has an integration waveform which increases with integration of the signal waveform of the signal pulse $P_0$ over the effective integration time $T_0'$ from the start of integration, as shown in FIG. 5B. This is then reset for the reset time $T_r$ until the start of integration of the next signal pulse, and acquisition of the integrated value in the gate integrator 32 is executed.

In this way, by using as the integration time for the signal intensity the effective integration time T', the integration time can be prevented from becoming very long, and in addition, integration times appropriate to the pulse intervals T can be set for respective signal pulses P, so as to greatly increase the precision of the calculated energy E. The maximum integration time $T_{max}$ is set to, for example, approximately $3\tau$, where $\tau$ is the attenuation time constant of the pulse waveform f(t).

This effective integration time T' is set to the maximum integration time $T_{max}$ in cases where the pulse interval T is long; when the pulse interval T is short, however, it may be set to the minimum pulse interval to execute calculation of the energy E. Here, the minimum pulse interval should preferably be set with respect to the pulse interval $T_1$ preceding the signal pulse $P_0$ for measurement, and the succeeding pulse interval $T_0$.

By providing a minimum pulse interval for the previous pulse interval $T_1$, cases in which the pile-up of the preceding signal pulse $P_1$ with the signal pulse $P_0$ is too large can be eliminated. Also, by providing a minimum pulse interval for the succeeding pulse interval $T_0$, cases in which a sufficient integration time for the signal pulse $P_0$ cannot be secured can be eliminated.

In applying the above effective integration time T', in place of the integration response G(T) for the pulse interval T, if an effective integration response H(T) is defined for the effective integration time T', then this H(T) is expressed as:

$$H(T) = G(T') = 1 - \exp(-T'/\tau). \tag{8}$$

The pileup-corrected energy $E_0$ for the signal pulse $P_0$ can be calculated using the following eq. (9), obtained by modifying the above eq. (6) using this effective integration response H(T).

$$\begin{aligned}E_0 &= \frac{Q_0}{H(T_0)} - Q_1 \frac{\exp(-T_1/\tau)}{H(T_1)} \\ &= Q_0 \cdot A(T_0) - Q_1 \cdot B(T_1).\end{aligned} \tag{9}$$

In this eq. (9), A(T) is a coefficient used to calculate the energy $E_0$ corresponding to the total integrated intensity from the integrated signal intensity $Q_0$ obtained from the gate integrator 32; its value is determined based on the pulse interval $T_0$ of the signal pulse $P_0$. Also, B(T) is a coefficient used in pileup correction using the integrated signal intensity $Q_1$ for the signal pulse $P_1$ immediately preceding; its value is determined based on the pulse interval $T_1$ of the signal pulse $P_1$.

From the above, by determining the coefficients $A(T_0)$ and $B(T_1)$ referring to the pulse intervals $T_0$ and $T_1$, the correct energy $E_0$ of the signal pulse $P_0$ can be easily calculated in the energy computing unit 11 from the integrated signal intensity $Q_0$ stored in the buffer memory 40 and the integrated signal intensity $Q_1$ stored in the buffer memory 41.

Here it is preferable that the values of each of the coefficients A(T) and B(T) used in calculating the energy $E_0$ be determined in advance from the values of a plurality of pulse intervals T, and that a lookup table 12 (cf. FIG. 4) be created from the values of the coefficients. By this means, the values of the coefficients $A(T_0)$ and $B(T_1)$ can be read from two lookup tables contained in the lookup table 12, a lookup table for the coefficient A(T) and a lookup table for the coefficient B(T), for the acquired pulse intervals $T_0$ and $T_1$, and the pileup-corrected energy $E_0$ can be quickly and efficiently calculated.

Next, the case in which the pulse waveform of the signal pulse P is a general time domain waveform (general waveform) which cannot be expressed as a single exponential function is explained.

Figure 6:
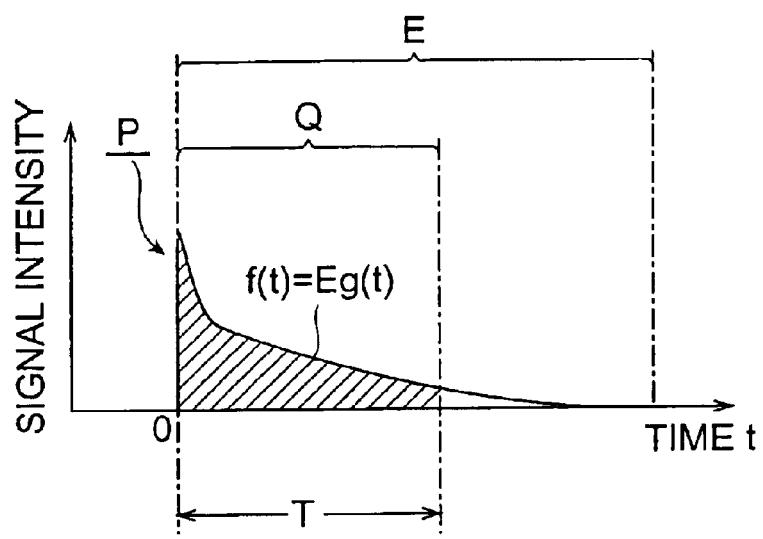
FIG. 6 is a graph showing schematically another example of the pulse waveform of a signal pulse.

A general waveform of a signal pulse output from a scintillation detector to correspond to radiation detection may, for example, be expressed as the sum of a plurality of exponential functions with different attenuation time constants. As an example of the pulse waveform of a signal pulse having a general waveform, FIG. 6 is a graph showing schematically a pulse waveform f(t)=Eg(t), including a component with a small attenuation time constant and which attenuates rapidly, and a component with a large attenuation time constant and which attenuates slowly.

In pileup correction of a signal pulse having such a general waveform, due to differences in the time domain waveforms, the above eq. (6) or eq. (9) cannot be applied; however, the signal intensity (charge amount) due to the preceding signal pulse piled-up with the signal pulse to be measured can be inferred from the signal pulse energy, previously measured, of another signal pulse, and pileup correction can be similarly performed.

Figure 7:
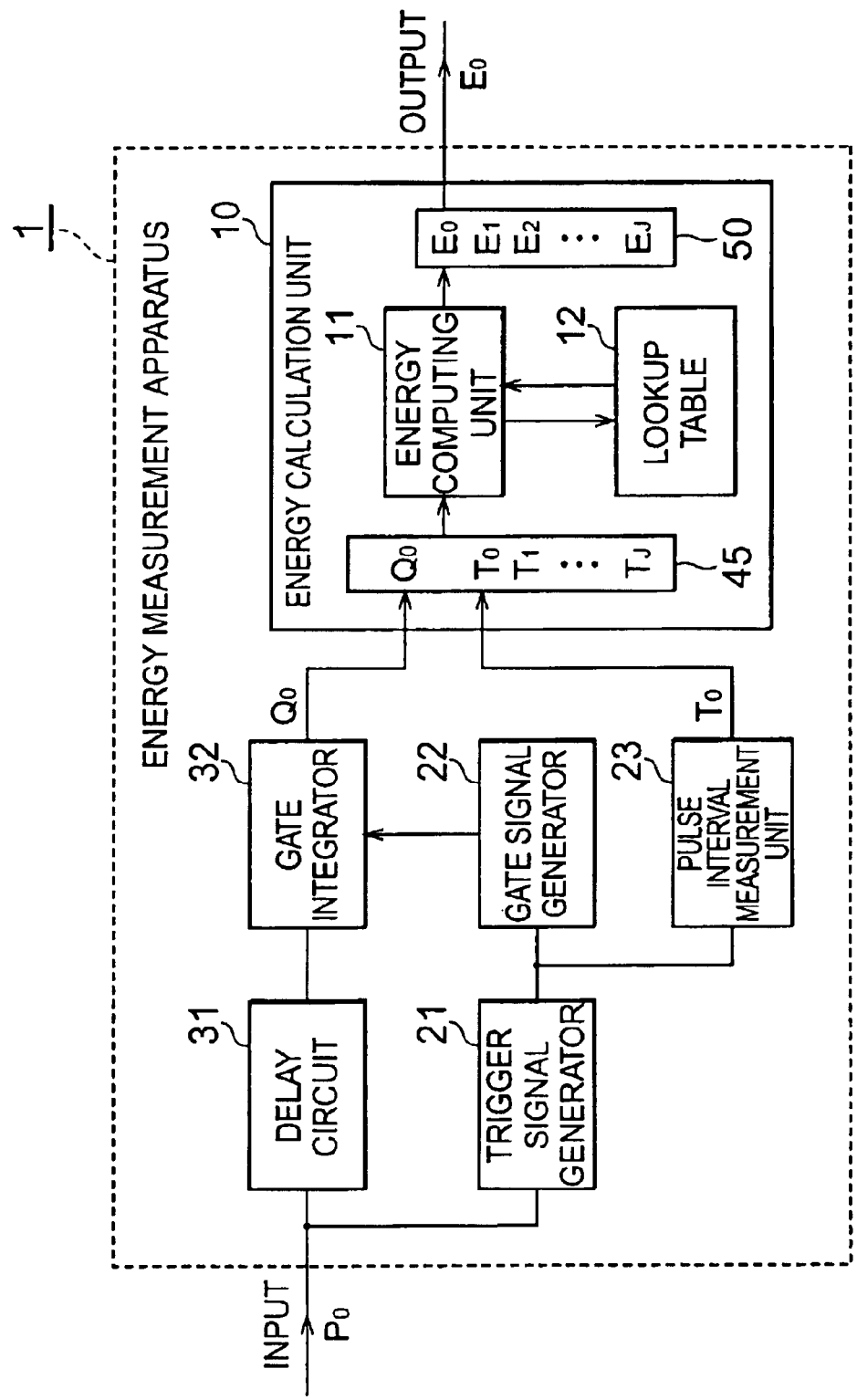
FIG. 7 is a block diagram showing the configuration of a third embodiment of an energy measurement apparatus.

FIG. 7 is a block diagram showing the configuration of a third embodiment of an energy measurement apparatus. This energy measurement apparatus 1 has a configuration which can be applied to measurement of the energy of a signal pulse having a general waveform which cannot be represented as a single exponential function, as for example in the example of the pulse waveform of a signal pulse P for measurement like that shown in FIG. 6.

In the energy measurement apparatus 1 of this embodiment, the trigger signal generator 21, gate signal generator 22, pulse interval measurement unit 23, delay circuit 31, and gate integrator 32 are similar to those of the embodiment shown in FIG. 3.

The energy calculation unit 10 in this embodiment has an energy computing unit 11, lookup table 12, data input-side buffer memory 45, and energy output-side buffer memory 50. The energy computing unit 11 performs computations necessary to calculate the energy $E_0$ corresponding to the input signal pulse $P_0$ for measurement. The lookup table 12 stores coefficient data to be used in computations executed by the energy computing unit 11.

The data input-side buffer memory 45 stores the integrated signal intensity $Q_0$ input from the gate integrator 32 and the pulse interval $T_0$ input from the pulse interval measurement unit 23, corresponding to the signal pulse $P_0$ for measurement at each moment. Also, the pulse intervals $T_1, T_2, \ldots, T_J$ for J signal pulses $P_1, P_2, \ldots, P_J$ (where J is an integer equal to or greater than 1) continuously preceding the signal pulse $P_0$ are stored. The energy output-side buffer memory 50 stores the energy $E_0$ calculated for the signal pulse $P_0$; also stored are the energies $E_1, E_2, \ldots, E_J$ for J signal pulses $P_1, P_2, \ldots, P_J$ preceding the signal pulse $P_0$. These data values are input data for computations to calculate the energy by the energy computing unit 11.

A polynomial correction method, which is a method for computing the energy E that can be applied to cases in which the pulse waveform of the signal pulse P is a general waveform, is explained below, referring to the configuration of the energy measurement apparatus 1 shown in FIG. 7, and in particular to the configuration of the energy calculation unit 10.

As shown in the example of FIG. 6, if it is assumed that the pulse waveform of the signal pulse P is a general time domain waveform expressed by f(t)=Eg(t), then the integration response G(T) corresponding to the integration response appearing in eq. (3) for the case of a single exponential function becomes $$G(T) = \int_0^T g(t)dt. \quad (10)$$

Applying the effective integration time T' of eq. (7), taking into account the reset time $T_r$ in the gate integrator 32 and maximum integration time $T_{max}$, the effective integration response H(T) corresponding to the effective integration response in eq. (8) is expressed by:

$$H(T) = G(T') = \int_0^{T'} g(t)dt. \quad (11)$$

The pileup-corrected energy $E_0$ of the signal pulse $P_0$ can be calculated as in the following eq. (12), using this effective integration response H(T):

$$E_0 = \frac{Q_0}{H(T_0)} - \sum_{j=1}^{J} E_j \frac{H(t_j + T_0) - H(t_j)}{H(T_0)} \quad (12)$$

$$= Q_0 \cdot C_0(T_0) - \sum_{j=1}^{J} E_j \cdot C_j(T_j).$$

Here J is the number of signal pulses $P_1, \ldots, P_J$, input previous to the signal pulse $P_0$ for measurement, that are used in pileup correction. This number J also corresponds to the number of values of the previous pulse intervals $T_1, \ldots, T_J$ stored in the above buffer memory 45, and the number of values of the previous energies $E_1, \ldots, E_J$ stored in the buffer memory 50.

In eq. (12), $C_0(T)$ is a coefficient used to calculate the energy $E_0$ corresponding to the total integrated intensity from the integrated signal intensity $Q_0$ obtained from the gate integrator 32; its value is determined based on the pulse interval $T_0$ of the signal pulse $P_0$. Also, $C_j(T_j)=C_j(t_j, T_0)$ (j=1, ..., J) are coefficients used to perform pileup correction, using the energies $E_j$ of the J signal pulses $P_j$ preceding the signal pulse $P_0$, and are determined based on the pulse intervals $T_j$ of the signal pulses $P_j$. Also, $t_j$ corresponds to the time of the leading edge of the signal pulse $P_j$ if the time of the leading edge of the signal pulse $P_0$ is 0 (cf. FIG. 2A); expressed in terms of the pulse intervals $T_j$, it can be written:

$$t_j = T_1 + T_2 + \ldots + T_j. \quad (13)$$

Thus by determining the coefficients $C_0(T_0)$ and $C_j(T_j)$ in the energy computing unit 11, referring to the pulse intervals $T_0, T_1, \ldots, T_J$, the energy $E_0$ of the signal pulse $P_0$ can easily be determined accurately from the integrated signal intensity $Q_0$ stored in the buffer memory 45 and from the energies $E_1, \ldots, E_J$ stored in the buffer memory 50, even in cases where the pulse waveform of the signal pulse $P_0$ is a general waveform.

Here it is preferable that the values of each of the coefficients $C_0(T)$ and $C_j(T)$ (j=1, ..., J) used in calculating the energy $E_0$ be determined in advance for a plurality of values of the pulse interval T, and that a lookup table 12 (cf. FIG. 7) be created from these coefficient values. By this means, the pileup-corrected energy $E_0$ can be calculated quickly and efficiently.

The larger the number J of signal pulses used in pileup correction, the more the precision of pileup correction, and therefore the precision of the calculated energy $E_0$ is improved. In actual practice, it is preferable that an appropriate number J be set in consideration of the pulse waveform of the signal pulses for measurement, the frequency of input of signal pulses, the time required for computations to calculate the energy $E_0$, the amount of data in the lookup table prepared, and other factors.

As explained above, the method for calculating the energy using the eq. (12) for a general waveform is a polynomial correction method which performs pileup correction using J signal pulses preceding the signal pulse $P_0$. Except for the fact that the effect of the J+1th and subsequent signal pulses is ignored, this eq. (12) is an accurate expansion of the energy $E_0$. On the other hand, in order to simplify the energy computations and reduce the number of data values used in computations, it is also possible to use a binomial approximation method, a trinomial approximation method or similar to perform pileup correction for a general waveform.

In a binomial approximation method, the electric charge of signal pulses prior to the signal pulse $P_2$ is ignored (cf. FIG. 2A) in calculating the energy $E_0$ of the signal pulse $P_0$, and it is assumed that the amount of electric charge from the time $-t_1$ of the leading edge of the preceding signal pulse $P_1$ to the time 0 of the leading edge of the signal pulse $P_0$ is entirely due to the signal pulse $P_1$. At this time, the energy $E_0$ of the signal pulse $P_0$ after pileup correction can be determined approximately using the following eq. (14):

$$E_0 = \frac{1}{H(T_0)}\left[Q_0 - Q_1\frac{H(t_1+T_0)-H(t_1)}{H(T_1)}\cdot x\right] \quad (14)$$
$$= Q_0 \cdot D_0(T_0) - Q_1 \cdot D_1(T_1).$$

Here x is a correction coefficient determined empirically according to the pulse waveform.

Figure 8:
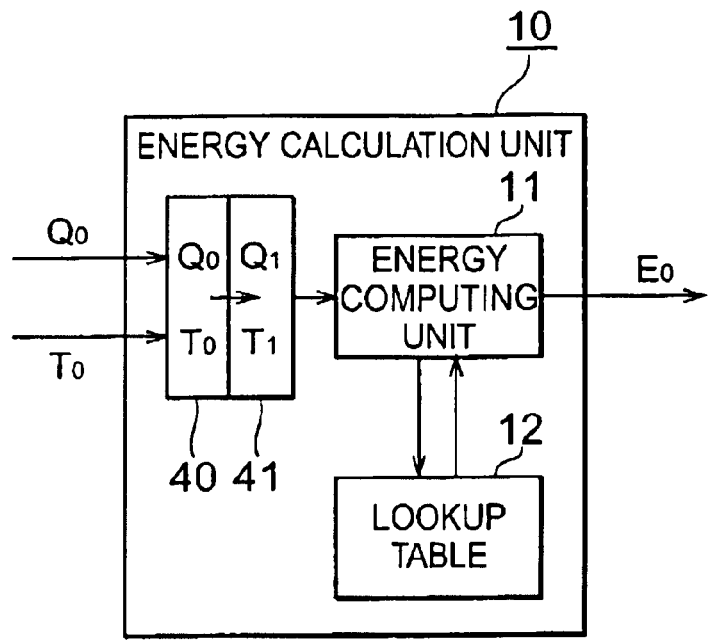
FIG. 8 is a block diagram showing an example of the configuration of an energy calculation unit.

FIG. 8 is a block diagram showing an example of the configuration of an energy calculation unit, corresponding to an energy calculation method using the binomial approximation method of eq. (14). This energy calculation unit 10 has an energy computing unit 11; lookup table 12; and two data input-side buffer memories 40, 41. Except for the details of computations executed by the energy computing unit 11, this configuration is equivalent to that shown in FIG. 4.

The buffer memory 40 stores the integrated signal intensity $Q_0$ and pulse interval $T_0$ corresponding to the signal pulse $P_0$ to be measured at each moment. The buffer memory 41 stores the integrated signal intensity $Q_1$ and pulse interval $T_1$ for the signal pulse $P_1$.

The energy computing unit 11 determines the coefficients $D_0(T_0)$ and $D_1(T_1)$, referring to the pulse intervals $T_0$ and $T_1$, or reads the values of the coefficients $D_0(T_0)$ and $D_1(T_1)$ from the lookup table 12. By this means, the pileup-corrected energy $E_0$ can be calculated from eq. (14) using the integrated signal intensity $Q_0$ stored in the buffer memory 40 and the integrated signal intensity $Q_1$ stored in the buffer memory 41.

In a trinomial approximation method, the electric charge of signal pulses preceding the signal pulse $P_3$ is ignored when calculating the energy $E_0$ of the signal pulse $P_0$; the effect of the energy $E_1$ of the signal pulse $P_1$ is corrected properly, and in addition it is assumed that the electric charge from the time $-t_2$ of the leading edge of the signal pulse $P_2$ until the time $-t_1$ of the leading edge of the signal pulse $P_1$ is assumed to be entirely due to the signal pulse $P_2$. At this time, the energy $E_0$ of the signal pulse $P_0$ after pileup correction can be calculated approximately using the following eq. (15);

$$E_0 = \frac{1}{H(T_0)}\left[Q_0 - E_1\{H(t_1+T_0)-H(t_1)\} - Q_2\frac{H(t_2+T_0)-H(t_2)}{H(T_2)}\cdot x\right] \quad (15)$$
$$= Q_0 \cdot D_0(T_0) - E_1 \cdot D_1(T_1) - Q_2 \cdot D_2(T_2).$$

Here x is a correction coefficient determined empirically according to the pulse waveform.

Figure 9:
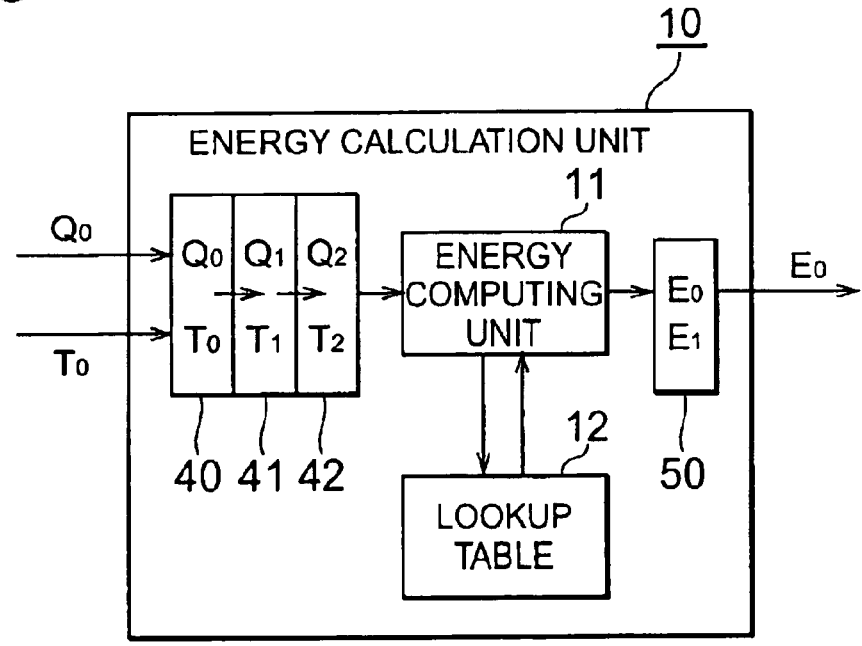
FIG. 9 is a block diagram showing an example of the configuration of an energy calculation unit.

FIG. 9 is a block diagram showing an example of the configuration of an energy calculation unit, corresponding to an energy calculation method using the trinomial approximation method of eq. (15). This energy calculation unit 10 has an energy computing unit 11; a lookup table 12; three data input-side buffer memories 40, 41, 42; and an energy output-side buffer memory 50.

The data input-side buffer memory 40 stores the integrated signal intensity $Q_0$ and pulse interval $T_0$ corresponding to the signal pulse $P_0$ for measurement at each moment. The buffer memory 41 stores the integrated signal intensity $Q_1$ and pulse interval $T_1$ of the signal pulse $P_1$. And the buffer memory 42 stores the integrated signal intensity $Q_2$ and pulse interval $T_2$ of the signal pulse $P_2$. The energy output-side buffer memory 50 stores the energy $E_0$ of the signal pulse $P_0$ and the energy $E_1$ of the signal pulse $P_1$.

The energy computing unit 11 determines the coefficients $D_0(T_0)$, $D_1(T_1)$ and $D_2(T_2)$, referring to the pulse intervals $T_0$, $T_1$, and $T_2$, or reads the values of the coefficients $D_0(T_0)$, $D_1(T_1)$ and $D_2(T_2)$ from the lookup table 12. By this means, the pileup-corrected energy $E_0$ can be determined using eq. (15) from the integrated signal intensity $Q_0$ stored in the buffer memory 40, the energy $E_1$ stored in the buffer memory 50, and the integrated signal intensity $Q_2$ stored in the buffer memory 42.

Simulations were performed of energy measurements using, as methods of energy calculation, the above-described single exponential function correction method, polynomial correction method, binomial approximation method, and trinomial approximation method, and the results of each were confirmed. In these simulations, numerous signal pulses having a prescribed pulse waveform and energy were generated in a timewise-random manner with a prescribed average count rate, calculated values for energies were simulated based on the prescribed energy calculation methods and pileup correction methods, and the average pulse height distribution and energy resolution were estimated. The energy for individual pulse signals was expressed as the total number of photoelectrons collected by the first dynode of the photomultiplier tube, and the energy of measured pulse signals was assumed to undergo statistical fluctuations according to a Poisson distribution of the number of photoelectrons collected within the prescribed integration time. It was assumed that pulse intervals were accurately measured, and the error in measuring pulse intervals and errors due to digitization were ignored.

Figure 10:
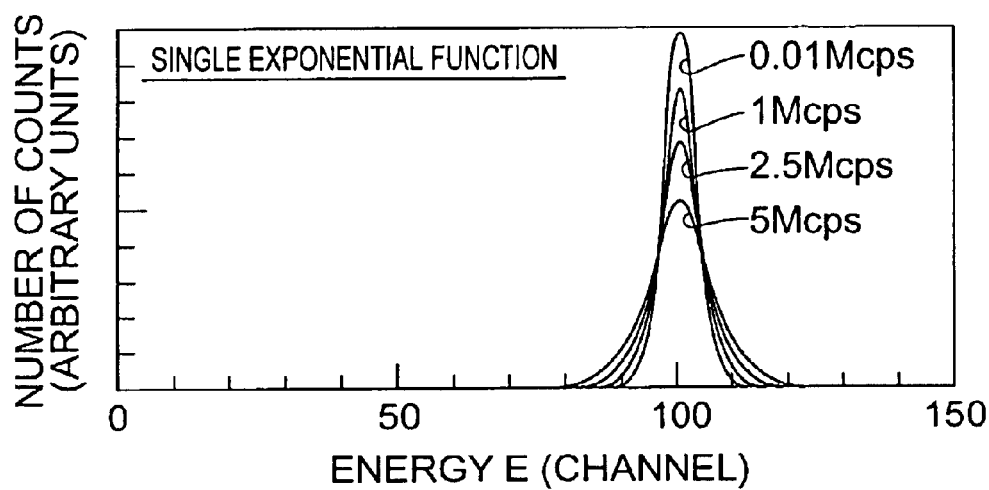
FIG. 10 is a graph showing the distribution of energy values calculated for input signal pulses using a single exponential function correction method.
Figure 11:
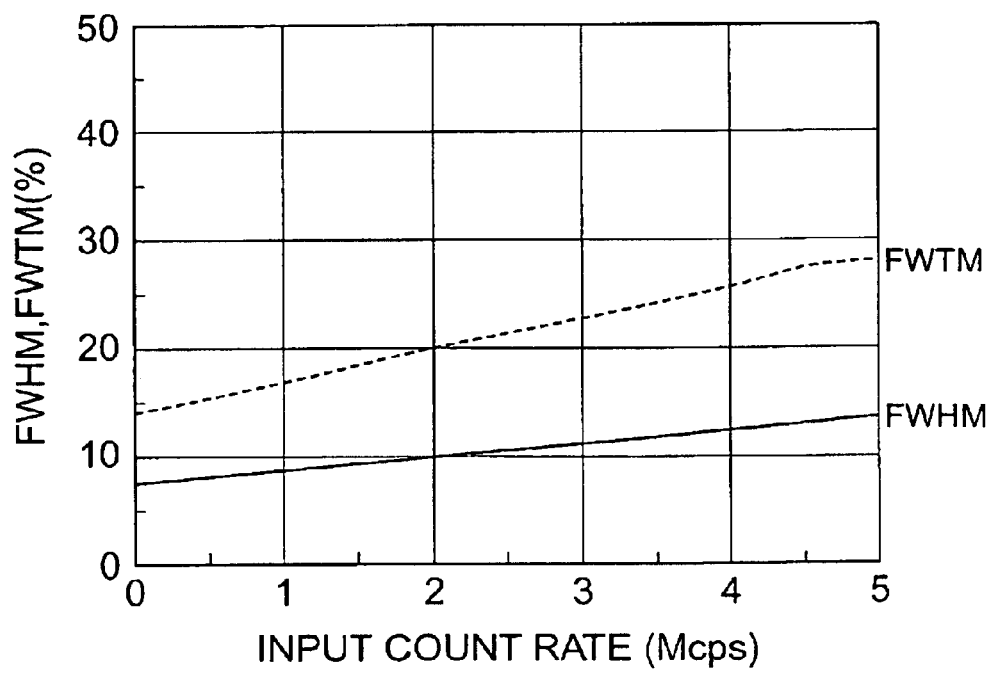
FIG. 11 is a graph showing the FWHM and FWTM of energy values calculated for input signal pulses using a single exponential function correction method.

Simulation results for energy calculations and pileup correction using the single exponential function correction method are first explained, referring to FIGS. 10 and 11. Here, it was assumed that the pulse waveform of the signal pulse P was a time domain waveform comprising a single exponential function component with an attenuation time constant τ=240 ns, and the energy, expressed as a number of photoelectrons, was taken to be 1000. As other conditions, the reset time was set at $T_r$=50 ns, and the maximum integration time at $T_{max}$=1000 ns.

FIG. 10 is a graph showing the distribution of energy values calculated for input signal pulses using the single exponential function correction method. In this graph, the horizontal axis indicates the calculated value (channel) for the energy E of the signal pulse P, and the vertical axis indicates the number of counts per channel.

In FIG. 10, the energy distribution shown was obtained by conducting simulations under four conditions, with input count rates at (1) 0.01 Mcps, (2) 1 Mcps, (3) 2.5 Mcps, and (4) 5 Mcps. As the input count rate increases, the energy resolution declines somewhat, but as a result of pileup correction, energy shifts and declines in energy resolution due to integration of the signal intensity of other signal pulses are suppressed.

FIG. 11 is a graph showing the full width at half-maximum (FWHM) and the full width at 10% of maximum (FWTM) of energy values calculated for input signal pulses using the single exponential function correction method. From these graphs also, it is seen that by performing pileup correction using a single exponential function correction method for signal pulses having a pulse waveform that is a single exponential function, the decline in energy resolution accompanying increases in the number of input signal pulses can be greatly suppressed.

Figure 12:
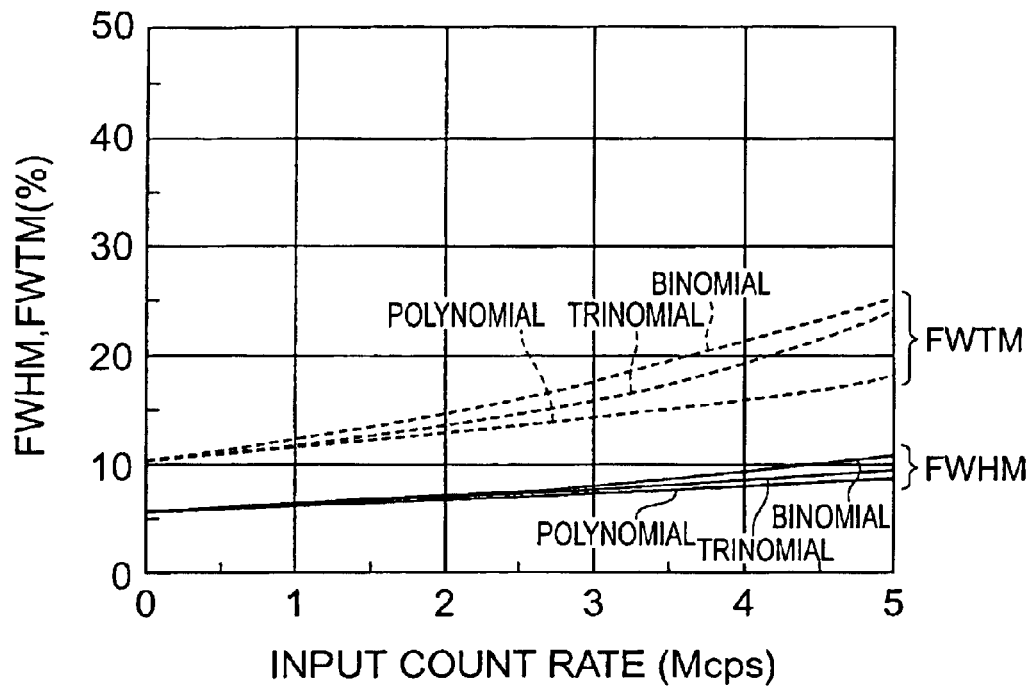
FIG. 12 is a graph showing the FWHM and FWTM of energy values calculated for input signal pulses using a binomial approximation method, trinomial approximation method, and polynomial correction method.
Figure 13:
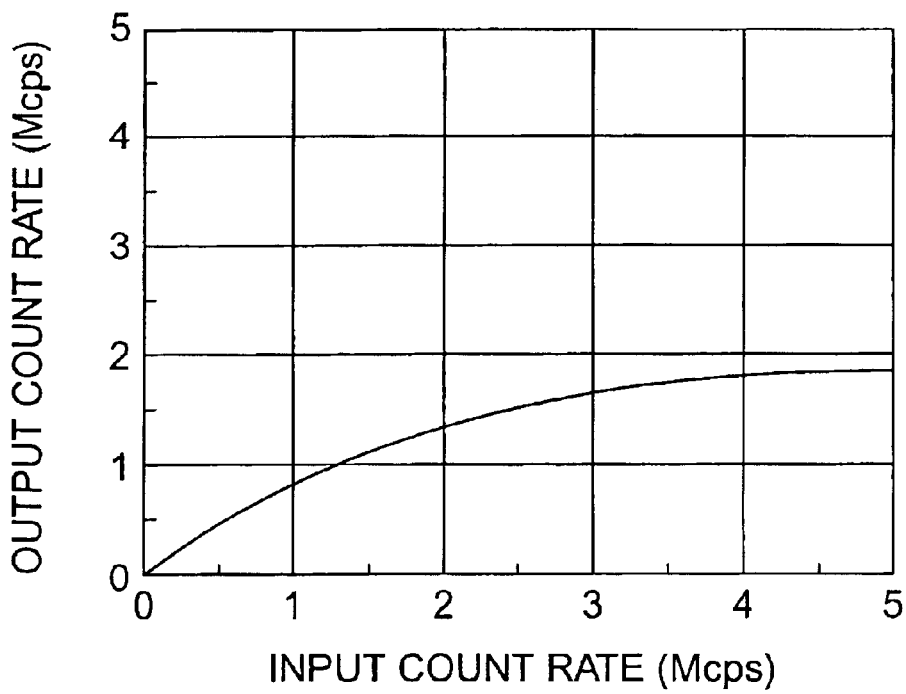
FIG. 13 is a graph showing the correlation between the number of input signal pulses and the number of outputs.

Next, results of the first simulation of energy calculations and pileup correction using the binomial approximation method, trinomial approximation method, and polynomial correction method are explained, referring to FIGS. 12 and 13. As the pulse waveform of the signal pulses P, a general time domain waveform was assumed having a first exponential function component with an attenuation time constant $\tau_1$=240 ns, and a second exponential function component with $\tau_2$=50 ns, with the ratio of intensities 70%:30%. As other conditions, the reset time was set to $T_r$=50 ns and the maximum integration time $T_{max}$ to 1000 ns, and the energy, expressed as the number of photoelectrons, was assumed to be 2000.

FIG. 12 is a graph showing the FWHM and FWTM of energy values calculated for input signal pulses using the binomial approximation method, trinomial approximation method, and polynomial correction method. In the binomial approximation method, the correction coefficient was taken to be x=1.1. In the trinomial approximation method, the correction coefficient was set to x=1.2. In the polynomial correction method, the number of signal pulses used in pileup correction was set to J=5.

From these graphs, it is seen that by using the binomial approximation method, trinomial approximation method, and polynomial correction method to perform pileup correction for signal pulses having a general pulse waveform, a decline in energy resolution accompanying increases in the number of input signal pulses can be greatly suppressed.

On comparing the binomial approximation method, trinomial approximation method, and polynomial correction method, by increasing the number of terms in pileup correction from two to three, and then to many (J=5), the precision of the calculated energy value is improved.

FIG. 13 is a graph showing the correlation between the input count rate and the output count rate in the above simulation results, that is, the count rate characteristic. As a result of setting the minimum integration time to 100 ns, only those signal pulses for which the pulse interval, both preceding and following, is 100 ns (total 200 ns) or more are detected; hence a state of saturation is seen at an output count rate of 5 Mcps.

Figure 14:
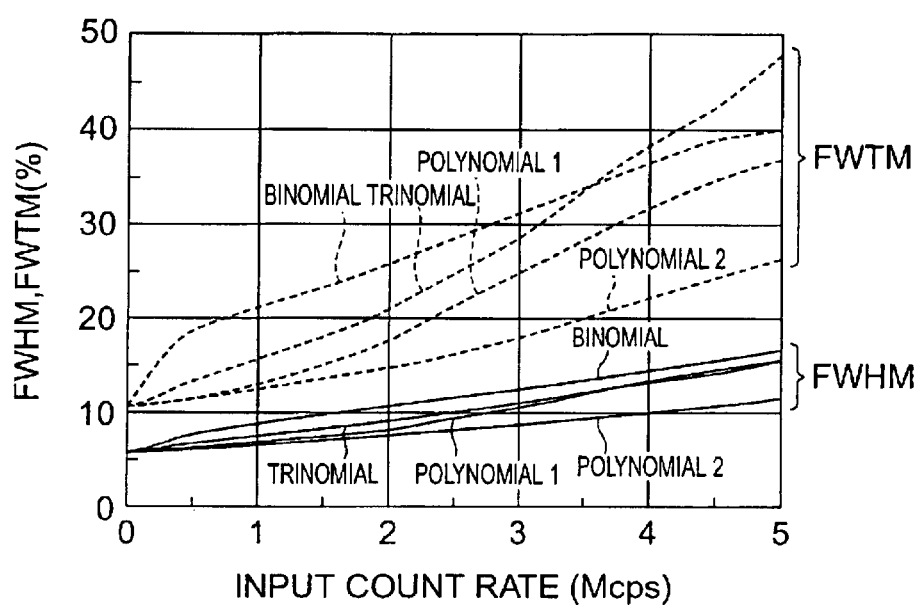
FIG. 14 is a graph showing the FWHM and FWTM of energy values calculated for input signal pulses using a binomial approximation method, trinomial approximation method, and polynomial correction method.
Figure 15A:
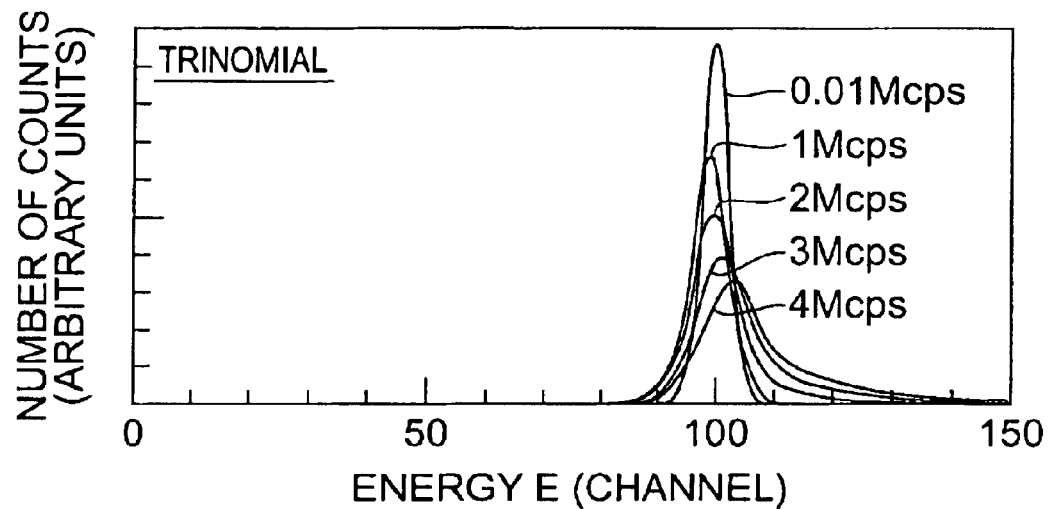
FIG. 15A and FIG. 15B are graphs showing the distribution of energy values calculated for input signal pulses using (A) the trinomial approximation method, and (B) the polynomial approximation method.
Figure 15B:
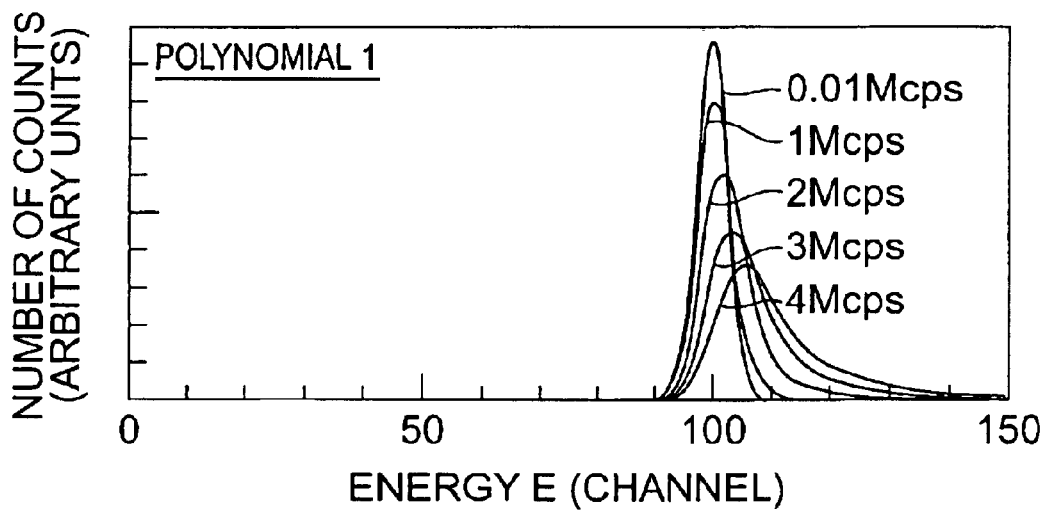

Next, results of the second simulation of energy calculations and pileup correction using the binomial approximation method, trinomial approximation method, and polynomial correction method are explained, referring to FIGS. 14, 15A, and 15B. Here, as the pulse waveform of the signal pulses P, a general time domain waveform was assumed having a first exponential function component with an attenuation time constant $\tau_1$=1000 ns, a second exponential function component with $\tau_2$=210 ns, and a third exponential function component with $\tau_3$=26 ns, and with the ratio of intensities 30%:30%:40%. Other conditions are similar to those of FIGS. 12 and 13.

FIG. 14 is a graph showing the FWHM and FWTM of energy values calculated for input signal pulses using a binomial approximation method, trinomial approximation method, and polynomial correction method. In the binomial approximation method, the correction coefficient was set to x=1.7; in the trinomial approximation method, the correction coefficient was set to x=2.0. And in the polynomial correction method, the number of signal pulses used in pileup correction was set to J=5 (polynomial 1) and J=10 (polynomial 2).

From this graph, similarly to the graph of FIG. 12, it is seen that by performing pileup correction of signal pulses having a general pulse waveform, using the binomial approximation method, trinomial approximation method, or the polynomial correction method, reductions in energy resolution accompanying an increase in the number of input signal pulses can be greatly suppressed.

On comparing the binomial approximation method, trinomial approximation method, and polynomial correction method with J=5 and with J=10, it is seen that by increasing the number of terms in the pileup correction, the precision of the calculated energy value obtained is improved.

FIGS. 15A and 15B are graphs showing the distribution of energy values for input signal pulses, using (A) the trinomial approximation method, and (B) the polynomial approximation method with J=5.

FIGS. 15A and 15B show energy distributions obtained in simulations conducted under five conditions for the input count rate: (1) 0.01 Mcps, (2) 1 Mcps, (3) 2 Mcps, (4) 3 Mcps, and (5) 4 Mcsp. As the input count rate increases, the energy resolution declines somewhat, and the center value of the energy distribution is shifted somewhat toward higher energies; but it is seen that pileup correction greatly suppresses the energy shift and decline in energy resolution.

As explained above, when applying the binomial approximation method, trinomial approximation method, and polynomial correction method to a general waveform, by increasing the number of terms in the pileup correction (the number of signal pulses used in pileup correction), the precision of the calculated energy value is improved. On the other hand, if the number of terms in pileup correction becomes large, the computations needed to calculate the energy become complex, and when using lookup tables, the number of lookup tables needed and the number of data values increase. Consequently it is preferable that an appropriate number of terms for pileup correction, and an appropriate correction method, be selected according to the required precision of the calculated energy values and the anticipated frequency of signal pulse input.

In energy measurements, sometimes data values for the acquired integrated signal intensity Q and pulse interval T for continuously input signal pulses P are collected in list mode, and energy calculations are performed in off-line analysis after data collection, or in parallel with data collection. In such cases, it is possible to execute computations for energy calculations in software separate from the data collection; hence application is also possible for complex computations, as in the case of the polynomial correction method for pileup correction in which the number of terms J is increased.

As the configuration of an apparatus for energy calculations performed in off-line analysis, an energy calculation apparatus configuration is possible in which, of the above-described configuration of the energy measurement apparatus 1, the energy calculation unit 10 is provided separately (for example, as a computer having software for energy calculation). In this case, in place of the energy calculation unit 10 in the energy measurement apparatus 1, recording means which records integrated signal intensities Q, pulse intervals T and other data on prescribed recording media may be provided.

In energy measurements of general waveforms other than single exponential function waveforms, a configuration may be employed which performs signal processing after shaping of the pulse waveform, as for example by using a differentiation circuit or other waveform-shaping circuit to first eliminate components with a long attenuation time constant.

It was previously noted that when expressing an emission pulse waveform by a single exponential function, the Wong method may be used as a conventional method. In order to compare the results of these methods, the single exponential function correction method of this invention, and the above Wong method, were used to conduct simulations of energy calculations and pileup correction. Here, the pulse waveform of signal pulses P was assumed to be a time domain waveform having a single exponential function component with an attenuation time constant τ of 300 ns; the energy, expressed as a number of photoelectrons, was 2000. Also, in the Wong method, in order to reduce the effect of the noise signal contained in the current signal, it was assumed that signal pulse smoothing was performed by a smoothing circuit prior to signal processing; simulations were conducted under three conditions, with smoothing times of 10 ns (conventional 1), 20 ns (conventional 2), and 50 ns (conventional 3).

Figure 16:
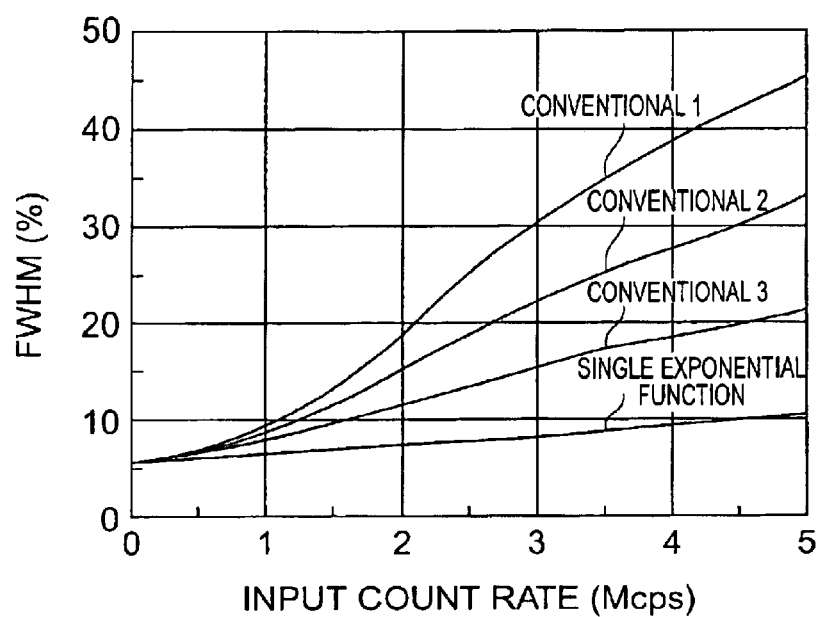
FIG. 16 is a graph showing the FWHM of energy values calculated for input signal pulses using the single exponential function correction method and a conventional correction method.

FIG. 16 is a graph showing the FWHM of energy values calculated for input signal pulses using the single exponential function correction method, and the Wong method, which is a conventional correction method. From these graphs it is seen that the effect in suppressing reductions in energy resolution accompanying increases in the input count rate is greater for the single exponential function correction method than when using the Wong method with signal pulse smoothing.

Figure 17A:
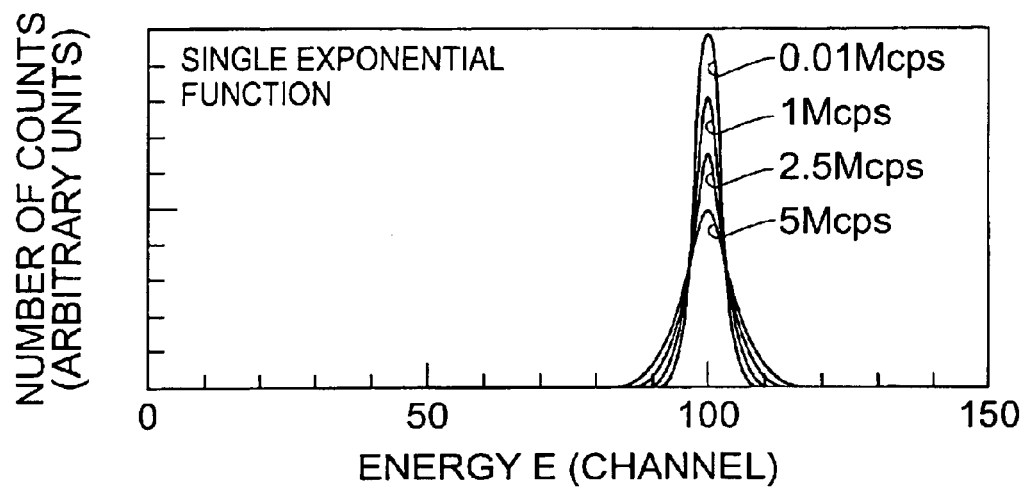
FIG. 17A and FIG. 17B are graphs showing the distribution of energy values calculated for input signal pulses using (A) the single exponential function correction method, and (B) a conventional correction method.
Figure 17B:
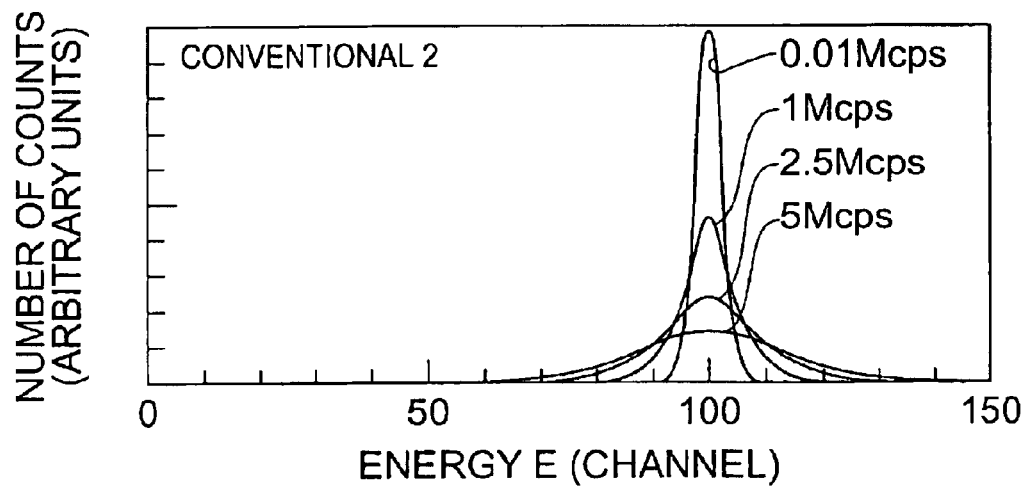

FIG. 17A and FIG. 17B are graphs showing the distribution of energy values calculated for input signal pulses using (A) the single exponential function correction method, and (B) the Wong method.

The energy distributions shown in FIGS. 17A and 17B were obtained in simulations conducted under four conditions for the input count rate: (1) 0.01 Mcps, (2) 1 Mcps, (3) 2.5 Mcps, and (4) 5 Mcps. From these graphs also, it is seen that the effect in suppressing reductions in energy resolution accompanying increases in the input count rate is greater for the single exponential function correction method.

Next, the case in which pulse shape discrimination is used is explained, as a fourth embodiment of an energy measurement apparatus of this invention. In pulse shape discrimination (PSD), a plurality of scintillators having different emission attenuation time constants are mounted on a photomultiplier tube, and detection is performed by discriminating the scintillator detecting radiation based on differences in the signal waveform. For example, if a scintillator for γ-rays and a scintillator for neutrons are mounted onto a single photomultiplier tube and employed in pulse shape discrimination, γ rays and neutron rays can be simultaneously discriminated and measured. Also, some scintillators exhibit different emission attenuation time constants depending on the type of radiation detected, whether γ rays, α particles, heavy particle beams, or similar. When using such a scintillator, pulse shape discrimination can be used to discriminate and measure different radiation types. There are various specific pulse shape discrimination methods. In the example below, a pulse shape discrimination method is employed which utilizes the fact that the ratio of integration values obtained when a signal pulse is integrated over two different times is different depending on the emission attenuation time constant; but this embodiment is not limited to this method.

Figure 18:
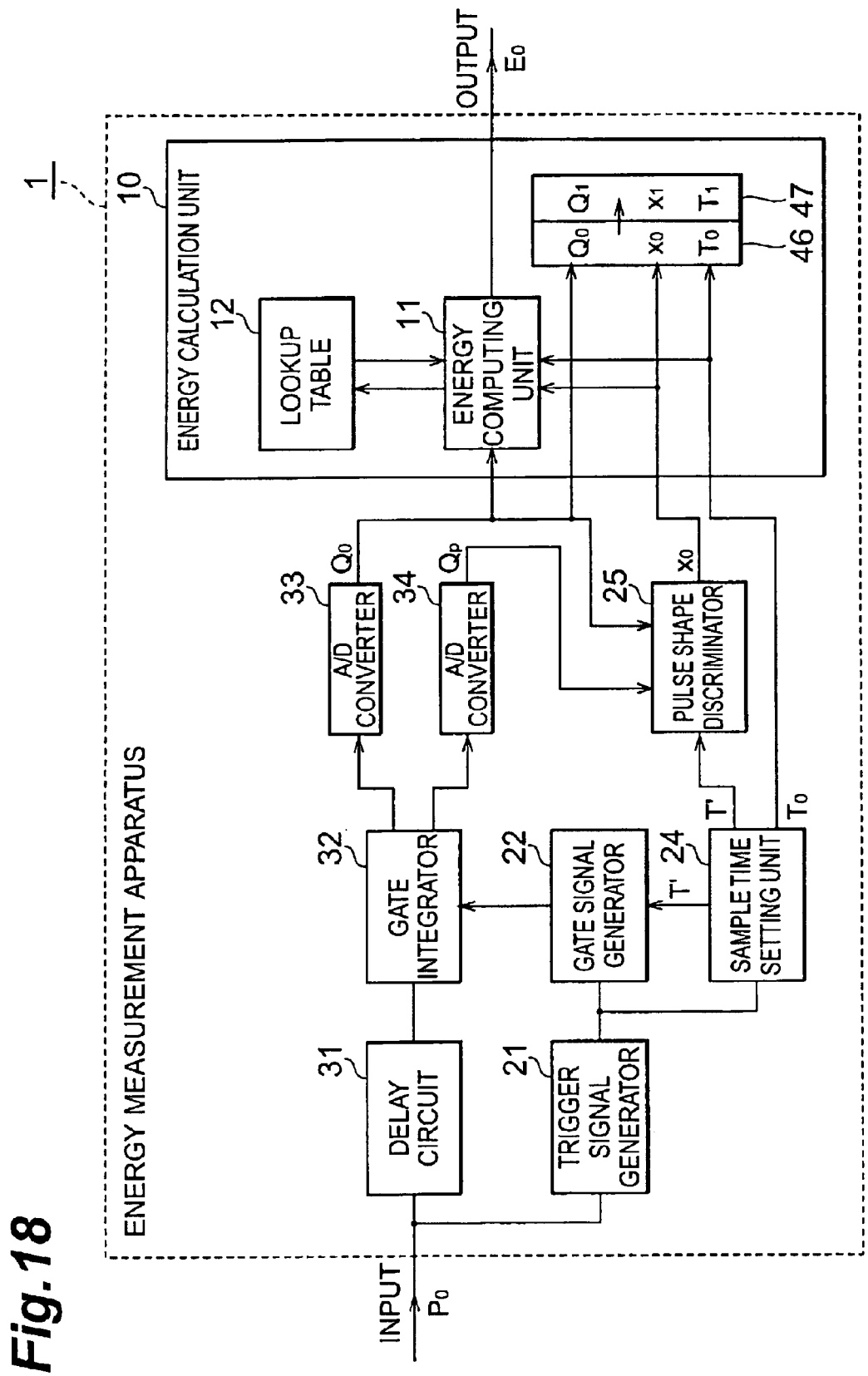
FIG. 18 is a block diagram showing the configuration of a fourth embodiment of an energy measurement apparatus.

FIG. 18 is a block diagram showing the configuration of the fourth embodiment, using such a pulse shape discrimination method. The energy measurement apparatus 1 has a configuration which can be applied to measurement of the energy of signal pulses when two kinds of signal pulses P for measurement are input, both having a single exponential function waveform, with different attenuation time constants $\tau^1$, $\tau_2$.

The configuration of the energy measurement apparatus 1 of this embodiment is similar to the embodiment shown in FIG. 3 with respect to the trigger signal generator 21, gate signal generator 22, delay circuit 31, and gate integrator 32.

In this embodiment, in place of the pulse interval measurement unit 23, a sample time setting unit 24 is provided, which functions as means for pulse interval measurement. The sample time setting unit 24 measures the pulse interval $T_0$ of the signal pulse $P_0$, and in addition sets the effective integration time T' (cf. eq. (7)) which is the sample time for integrating the signal intensity, based on the measured pulse interval $T_0$, and indicates this effective integration time T' to the gate signal generator 22. Based on the trigger signal input from the trigger signal generator 21 and the effective integration time T' indicated by the sample time setting unit 24, the gate signal generator 22 generates a gate signal to indicate integration of the signal intensity.

Based on the gate signal indication, the gate integrator 32 integrates the signal intensity of the signal pulse $P_0$ input from the delay circuit 31. The integrated signal intensity obtained by integration at the effective integration time T' indicated by the gate signal is output as integrated signal intensity data $Q_0$ via an A/D converter 33 comprising a sample hold circuit and ADC.

On the other hand, separately from the effective integration time T' which is set for each signal pulse $P_0$, an integration time $T_P$ is indicated to the gate integrator 32. This integration time $T_P$ is set to a fixed value in advance, to a time shorter than the anticipated effective integration time T' (T'>$T_P$). The integrated signal intensity obtained by integration at the integration time $T_P$ is output as integrated signal intensity data $Q_P$ via an A/D converter 34 comprising a sample hold circuit and ADC.

The integrated signal intensity $Q_0$ output from the A/D converter 33 and the integrated signal intensity $Q_P$ output from the A/D converter 34 are input to the pulse shape discriminator 25. The pulse shape discriminator 25 uses the ratio $Q_0/Q_P$ of the integrated signal intensities $Q_0$ and $Q_P$ with different integration times to perform discrimination of a plurality of pulse shape types (in this case, two types) based on shape discrimination conditions set in advance, and outputs the result $x_0$ of shape discrimination thus obtained ($x_0$=1 or 2).

The energy calculation unit 10 has an energy computing unit 11, lookup table 12, and two buffer memories 46, 47. The energy computing unit 11 performs computations necessary to calculate the energy $E_0$ of an input signal pulse $P_0$ to be measured. The lookup table 12 stores coefficient data used in computations executed by the energy computing unit 11.

For a signal pulse $P_0$ to be measured at each moment, the integrated signal intensity $Q_0$ output from the A/D converter 33, the pulse interval $T_0$ output from the sample time setting unit 24, and the shape discrimination result $x_0$ output from the pulse shape discriminator 25 are each input to the energy computing unit 11, and are stored in the buffer memory 46. Also, the integrated signal intensity $Q_1$, pulse interval $T_1$ and shape discrimination result $x_1$ for the signal pulse $P_1$ preceding the signal pulse $P_0$ are stored in the buffer memory 47. These data values become input data for computations by the energy computing unit 11 to calculate the energy.

The method of calculation of the energy E with pulse shape discrimination is explained in detail below, referring to the configuration of the energy measurement apparatus 1 shown in FIG. 18.

Suppose that, in the signal pulses P input to the energy measurement apparatus 1 for measurement, there exist two kinds of signal pulses, having pulse waveforms with different attenuation time constants $\tau_1$ and $\tau_2$. Then the pulse waveform $f_k(t)$, integrated signal intensity $Q_k(T)$, and integration response $G_k(T)$ for a signal pulse with attenuation time constant $\tau_k$ (k=1 or 2) are, respectively, $$f_k(t) = (E/\tau_k)\exp(-t/\tau_k) \quad (k = 1 \text{ or } 2) \tag{16a}$$

$$Q_k(T) = \int_0^T f_k(t)\,dt = E\{1 - \exp(-T/\tau_k)\} \tag{16b}$$

$$G_k(T) = 1 - \exp(-T/\tau_k). \tag{16c}$$

Of the two integration times, if the longer effective integration time T' is set according to eq. (7) using the reset time $T_r$ and maximum integration time $T_{max}$, then the effective integration response $H_k(T)$ can be written $$H_k(T)=G_k(T')=1-\exp(-T'/\tau_k). \tag{17}$$

The shorter integration time $T_P$ is set and fixed in advance, as described above.

As shown in FIG. 18, suppose that the shape discrimination results for the signal pulse $P_0$ to be measured and the preceding signal pulse $P_1$ are $k=x_0$, $x_1$ (both either 1 or 2), respectively. Then the energy $E_0$ after pileup correction for the signal pulse $P_0$ can be calculated using the following eq. (18):

$$E_0 = \frac{Q_0}{H_{x0}(T_0)} - Q_1 \frac{\exp(-T_1/\tau_{x1})}{H_{x1}(T_1)} \tag{18}$$
$$= Q_0 \cdot A_{x0}(T_0) - Q_1 \cdot B_{x1}(T_1).$$

The coefficients $A_1(T)$, $B_1(T)$ for pulse waveforms with attenuation time constant $\tau_1$, and the coefficients $A_2(T)$, $B_2(T)$ for pulse waveforms with attenuation time constant $\tau_2$, can be computed by the energy computing unit 11 on each occasion. Or, computations can be performed in advance to determine the coefficients $A_1(T)$, $B_1(T)$, $A_2(T)$, $B_2(T)$, and a lookup table 12 created. In this case, it is necessary to prepare the lookup tables with twice the number of tables and the data volume, compared with the case in which pulse shape discrimination is not performed.

Here, the pulse shape discrimination performed by the pulse shape discriminator 25 to discriminate the two types of pulse shapes with attenuation time constants $\tau_1$, $\tau_2$ is explained.

Figure 19A:
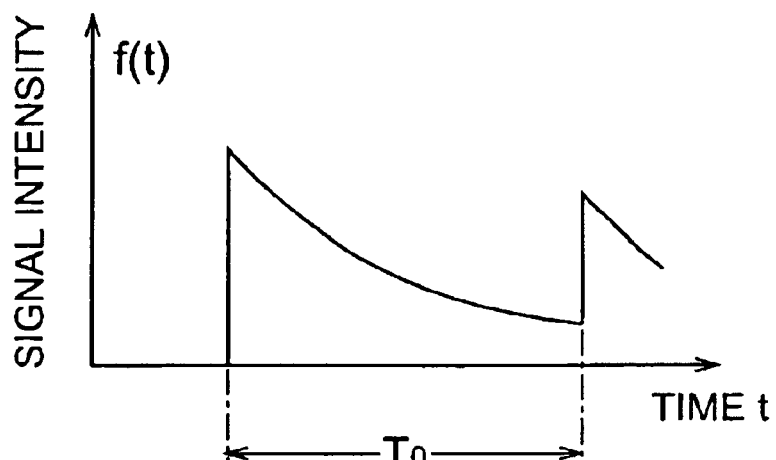
FIG. 19A and FIG. 19B are graphs showing the integration time settings for performing pulse shape discrimination of signal pulses.
Figure 19B:
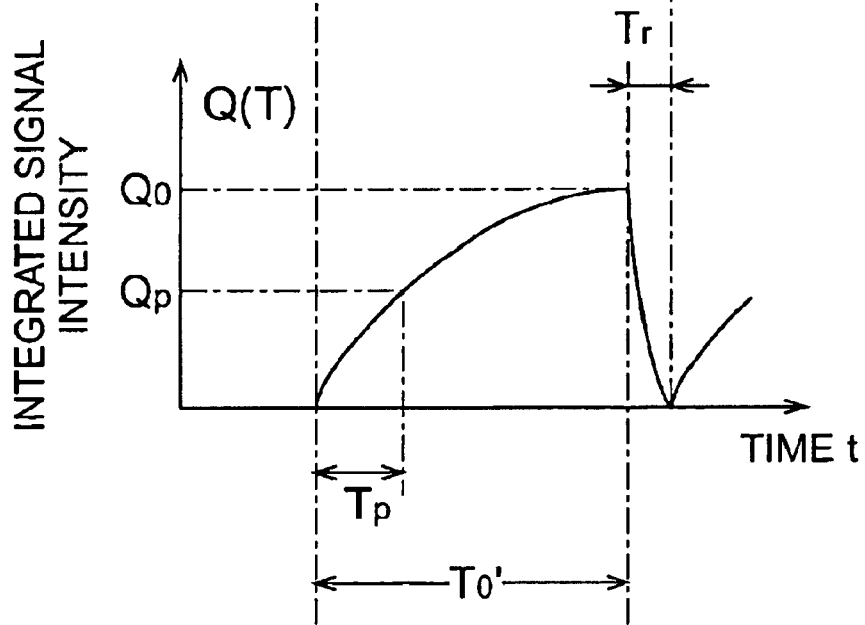

FIG. 19A and FIG. 19B are graphs showing the integration time settings for performing pulse shape discrimination of signal pulses P. Here, the graph of FIG. 19A shows a signal waveform the signal intensity of which changes with time; the graph of FIG. 19B shows the integrated waveform, which is an integrated signal intensity changing with time, obtained by integrating the signal waveform shown in FIG. 19A.

In the energy measurement apparatus 1 of this embodiment, as shown in FIGS. 19A and 19B, two integration times $T_0'$ and $T_P$ are set for integration of the signal intensity of the signal pulse $P_0$. Of these, the longer integration time $T_0'$ is the ordinary effective integration time, similar to the case in which pulse shape discrimination is not performed, shown in FIGS. 5A and 5B. The shorter integration time $T_P$ is an integration time which is set and fixed for the purpose of pulse shape discrimination. In the pulse shape discriminator 25, by comparing the integrated signal intensity $Q_0$ obtained using the longer integration time T' and the integrated signal intensity $Q_P$ obtained using the shorter integration time $T_P$, the two types of pulse shape can be discriminated.

Figure 20:
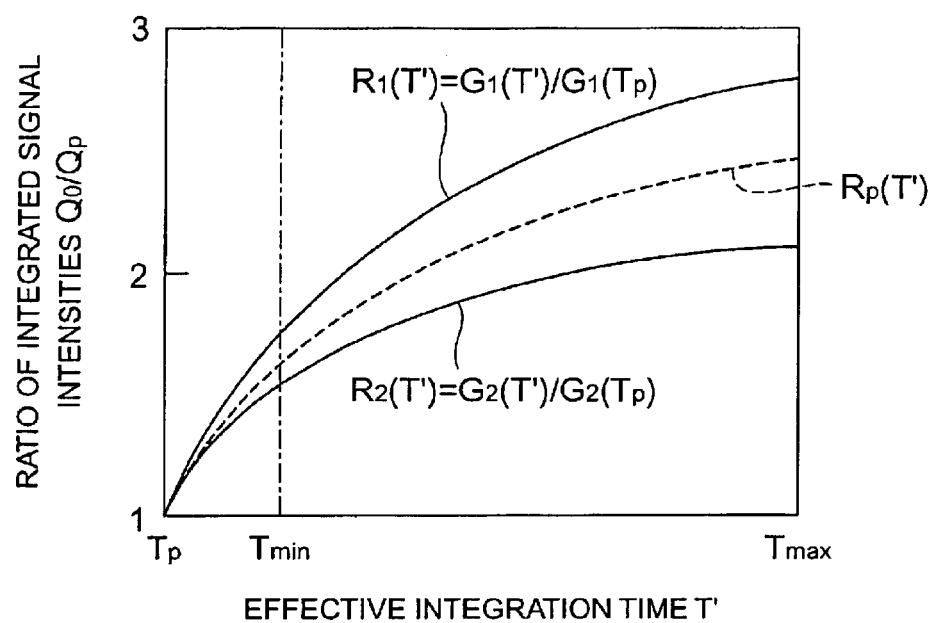
FIG. 20 is a graph showing a method of discrimination of pulse shapes of signal pulses.

FIG. 20 is a graph showing the method of discrimination of the pulse shapes of signal pulses. In this graph, the horizontal axis indicates the effective integration time T', which fluctuates depending on the pulse interval T for each signal pulse P, and the vertical axis indicates the ratio $Q_0/Q_P$ of integrated signal intensities.

Due to the difference in the rates of attenuation of pulse shapes with attenuation time constant $\tau_1$ and pulse shapes with attenuation time constant $\tau_2$, even when the integration time T' (T'>$T_P$) is the same, the ratio $R(T')=Q_0/Q_P$ of the integrated signal intensities $Q_0$ and $Q_P$ will have different values for the two pulse shapes. Hence by using the value of this ratio, the two types of pulse shape can be discriminated.

The graph of FIG. 20 shows the dependences on the effective integration time T' of the ratio $R_1(T')=G_1(T')/G_1(T_P)$ of integrated signal intensities for the pulse shape with attenuation time constant $\tau_1$, and the ratio $R_2(T')=G_2(T')/G_2(T_P)$ of integrated signal intensities for the pulse shape with attenuation time constant $\tau_2$.

If the integration time is T'=$T_P$, then these ratios are $R_1(T')=R_2(T')=1$. As the effective integration time T' lengthens, the ratios $R_1(T')$ and $R_2(T')$ both tend to increase, and at the same time the difference between them increases. Hence the minimum integration time $T_{min}$ for an effective integration time T' is set to an integration time enabling differentiation by the pulse shape discriminator 25 of the difference between the ratios $R_1(T')$ and $R_2(T')$. Also, the shape discriminator curve $R_P(T')$ is set substantively in the center of the two curves for the ratios $R_1(T')$ and $R_2(T')$.

Thus by comparing the value of the above shape discrimination curve $R_P(T')$ in the pulse shape discriminator 25 with the ratio $R(T')=Q_0/Q_P$ of integrated signal intensities actually obtained for a signal pulse $P_0$, pulse shapes can be discriminated.

In other words, if the ratio obtained is $Q_0/Q_P>R_P$, then the signal pulse $P_0$ for measurement has a pulse shape with attenuation time constant $\tau_1$. At this time, the pulse shape discriminator 25 outputs $x_0=1$ as the shape discrimination result. On the other hand, if $Q_0/Q_P<R_P$, then the signal pulse $P_0$ has a pulse shape with attenuation time constant $\tau_2$. At this time, the pulse shape discriminator 25 outputs $x_0=2$ as the shape discrimination result.

In this way, by performing energy measurements accompanied by pulse shape discrimination, it is possible to perform energy calculations using a calculation method appropriate to different pulse shapes when signal pulses with different pulse shapes are input, as for example when signal pulses from a plurality of scintillators having different attenuation time constants are input for energy measurement.

Simulations were performed of energy calculations and pileup correction for the above case with pulse shape discrimination. It was assumed that there are two types of time domain waveform as the pulse shapes of signal pulses P, expressed as single exponential function components having respective attenuation time constants $\tau_1$=100 ns and $\tau_2$=50 ns, and it was further assumed that these pulses are generated randomly with the same probability. The energy was assumed to be constant (2000 photoelectrons). As other conditions, the reset time $T_r$ was set to 50 ns, the fixed integration time $T_P$ to 30 ns, the minimum integration time for an effective integration time T' to $T_{min}$=50 ns, and the maximum integration time to $T_{max}$=500 ns.

Figure 21A:
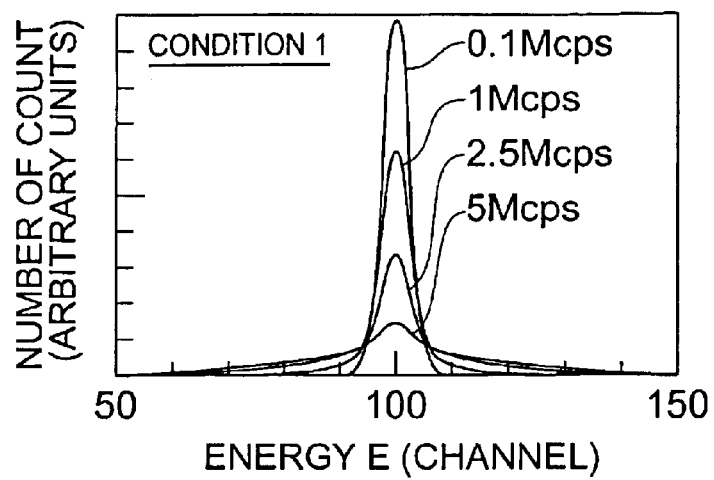
FIG. 21A to FIG. 21C are graphs showing the distribution of energy values calculated for input signal pulses using pulse shape discrimination and pileup correction.
Figure 21B:
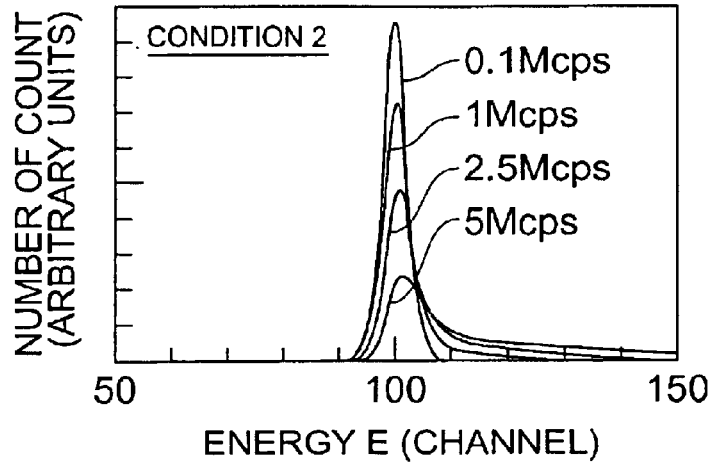
Figure 21C:
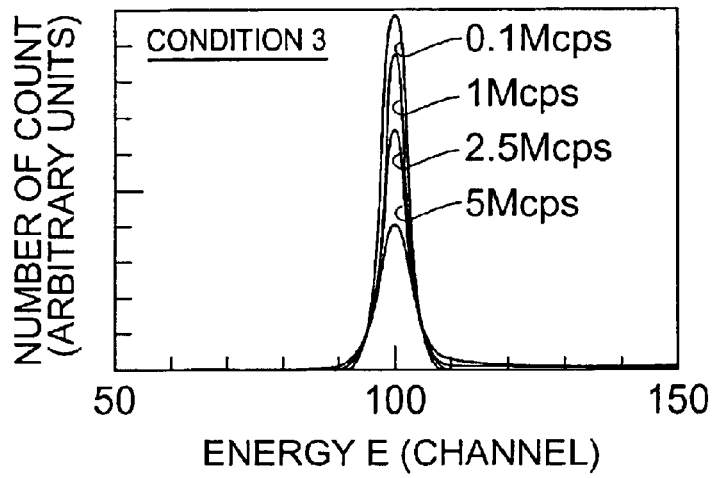

FIG. 21A to FIG. 21C are graphs showing the distribution of energy values calculated for input signal pulses using pulse shape discrimination and pileup correction. FIG. 21A shows the energy distribution for condition 1, in which integration time correction and pileup correction were not performed; FIG. 21B shows the energy distribution for condition 2, in which integration time correction only was performed; and FIG. 21C shows the energy distribution for condition 3, in which integration time correction and pileup correction were both performed.

Each of the graphs shows the energy distributions obtained in simulations under four different conditions for the input count rate: (1) 0.1 Mcps, (2) 1 Mcps, (3) 2.5 Mcps, and (4) 5 Mcps.

In the graph of FIG. 21A, which shows the integrated signal intensity Q as the energy E without modification, and without performing either pileup correction or integration time correction, the energy resolution declines as the input count rate increases; also, there occur a distribution at low energies as the integration time becomes shorter, and a distribution at high energies due to signal pulse pileup. In the graph of FIG. 21B, in which only integration time correction was performed, the low-energy distribution due to the integration time has vanished, but the high-energy distribution due to pileups remains.

On the other hand, in the graph of FIG. 21C resulting when both integration time correction and pileup correction are performed, both the distributions on the low energy and on the high energy sides have vanished. Also, the energy resolution is improved.

Figure 22:
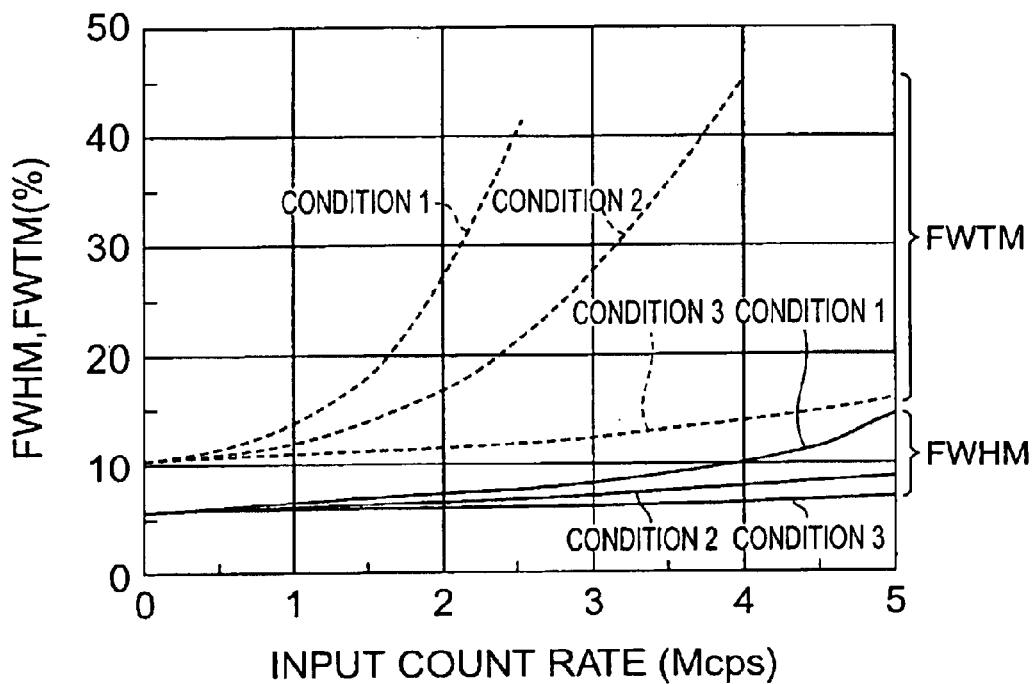
FIG. 22 is a graph showing the FWHM and FWTM of energy values calculated for input signal pulses using pulse shape discrimination and pileup correction.

FIG. 22 is a graph showing the FWHM and FWTM of energy values calculated for input signal pulses using pulse shape discrimination and pileup correction. Similarly to FIGS. 21A through 21C, curves corresponding to each of the conditions 1, 2 and 3 are shown. From this graph, it is seen that reduction of the energy resolution accompanying an increase in the number of input signal pulses is greatly suppressed under condition 3, in which both integration time correction and pileup correction are performed.

Figure 23:
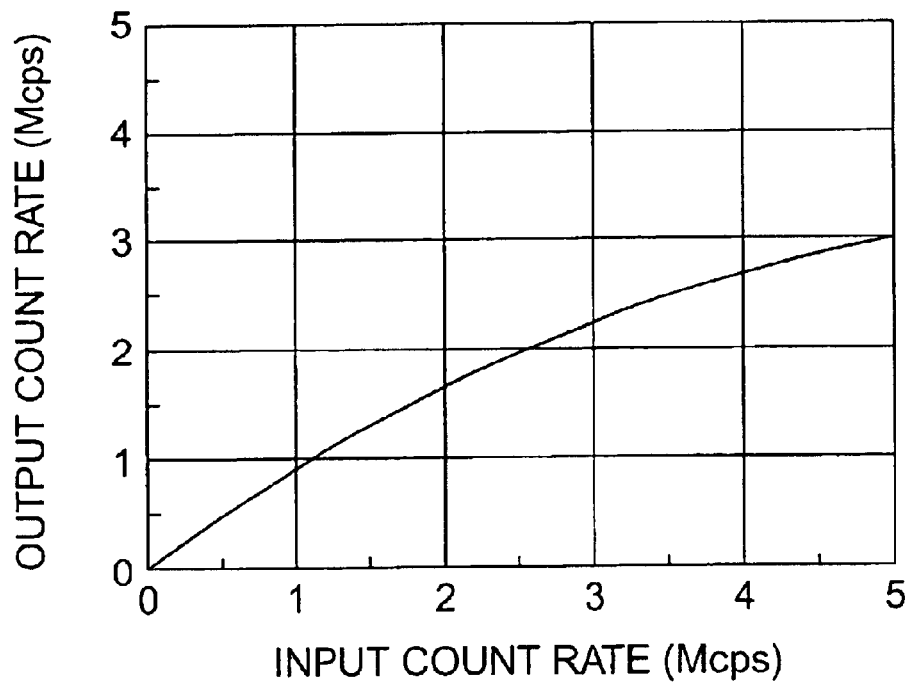
FIG. 23 is a graph showing the correlation between the number of input signal pulses and the number of outputs.

FIG. 23 is a graph showing the count rate characteristic for the above simulation results. As a result of setting the minimum integration time to 50 ns, the output count rate reaches saturation at 10 Mcps.

Figure 24:
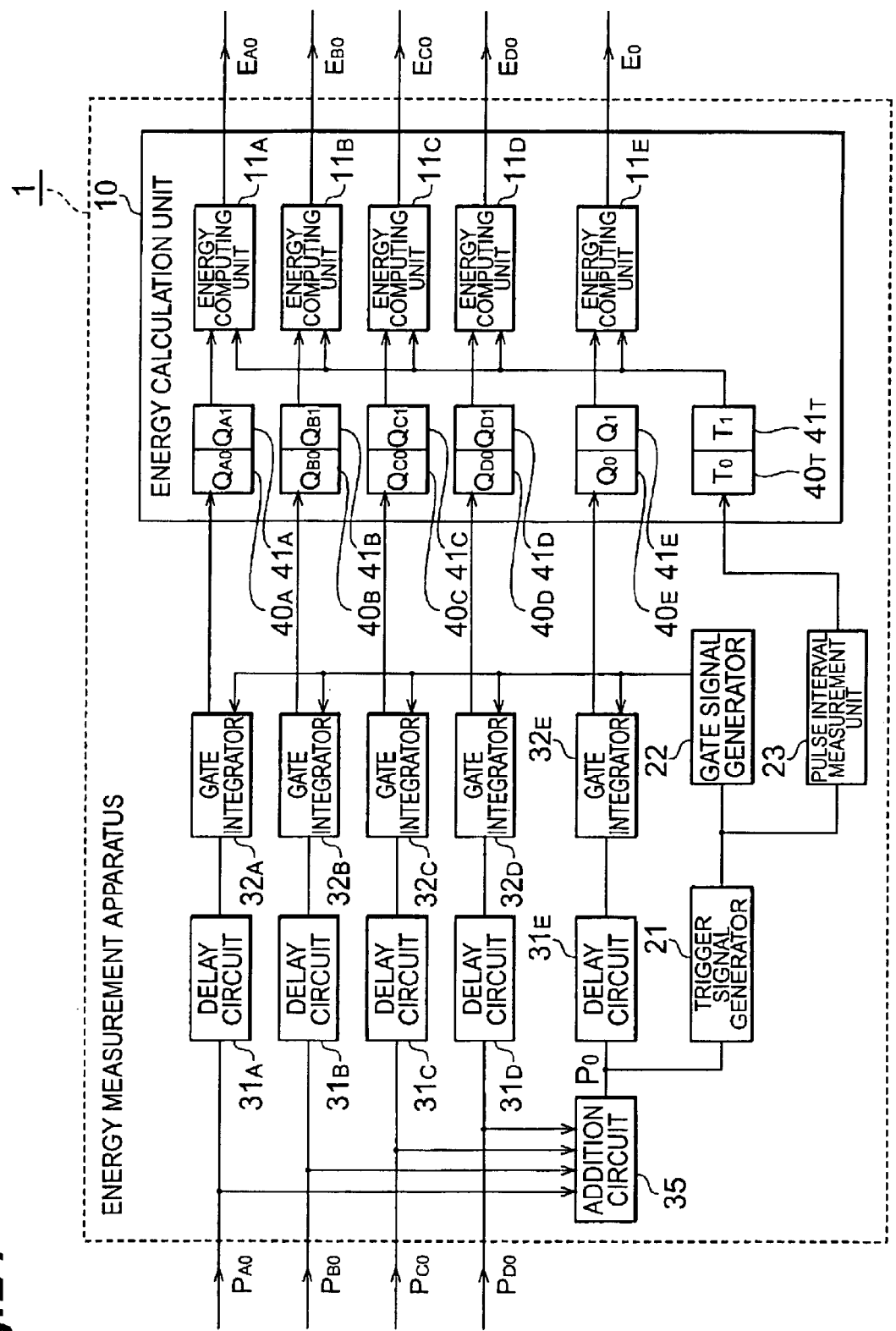
FIG. 24 is a block diagram showing the configuration of a fifth embodiment of the energy measurement apparatus; and, FIG. 25 is a perspective view of the construction of a block detector for a two-dimensional position-detecting type PET system.
Figure 25:
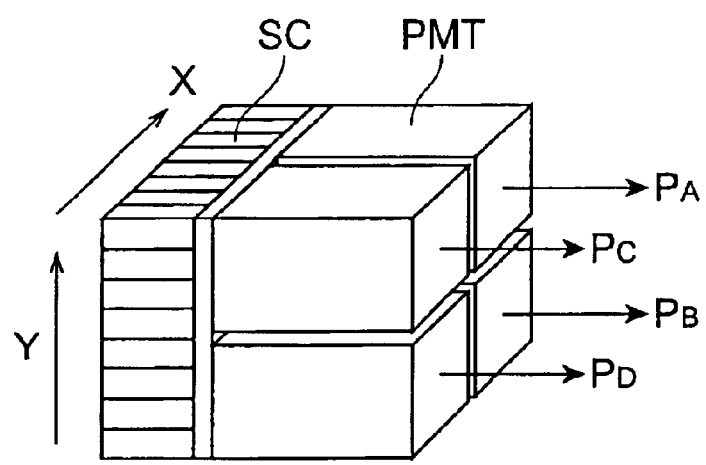

Next, as a fifth embodiment of an energy measurement apparatus, the case of application to signal pulses from a two-dimensional position detection-type radiation detector, used in gamma cameras, PET systems and similar, is explained. As one example, the case of application to signal pulses from a two-dimensional position detection-type block detector, commonly used in PET systems, is described. FIG. 24 is a block diagram showing the configuration of such an embodiment. As shown in FIG. 25, in the block detector used here, scintillator SC crystals of BGO (bismuth germanium oxide) or similar are arranged in a two-dimensional matrix (for example, an 8-row by 8-column matrix), and connected optically to four square-shape photomultiplier tubes PMT; if the signal pulses from the four photomultiplier tubes PMT are $P_A$, $P_B$, $P_C$, $P_D$, the energies of the respective signal pulses are $E_A$, $E_B$, $E_C$, $E_D$, and the sum of these energies is E, then the X and Y coordinates of a scintillator detecting a γ ray can be determined from $$X = \frac{(E_A + E_B) - (E_C + E_D)}{E}, \quad Y = \frac{(E_A + E_C) - (E_B + E_D)}{E}. \quad (19)$$

In place of the four photomultiplier tubes, a single position detection-type photomultiplier tube may be used.

When pileup of signal pulses occurs in such an apparatus, not only is the energy of radiation not correctly measured, but the radiation detection position is not correctly measured, so that degradation of the image resolution and image distortion occur.

The configuration of the energy measurement apparatus 1 of this embodiment is, in essence, a modification of the configuration shown in FIG. 4. Specifically, the trigger signal generator 21, gate signal generator 22, and pulse interval measurement unit 23 are similar to the embodiment shown in FIG. 4.

Also, an addition circuit 35 is provided which generates a signal pulse $P_0$ which is the sum obtained by adding the four signal pulses $P_{A0}$, $P_{B0}$, $P_{C0}$, $P_{D0}$ input for measurement. The signal pulse $P_0$ generated by this addition circuit 35 is input to the trigger signal generator 21.

In place of the delay circuit 31 and gate integrator 32, delay circuits $31_A$, $31_B$, $31_C$, $31_D$, and $31_E$, as well as gate integrators $32_A$, $32_B$, $32_C$, $32_D$, $32_E$, corresponding to the five signal pulses $P_{A0}$, $P_{B0}$, $P_{C0}$, $P_{D0}$, $P_0$ are provided.

Also, in place of the buffer memories 40 and 41 in the energy calculation unit 10, the buffer memories $40_A$, $40_B$, $40_C$, $40_D$, $40_E$, storing the integrated signal intensities $Q_{A0}$, $Q_{B0}$, $Q_{C0}$, $Q_{D0}$, $Q_0$ corresponding to the signal pulses $P_{A0}$, $P_{B0}$, $P_{C0}$, $P_{D0}$, $P_0$ respectively, and the buffer memories $41_A$, $41_B$, $41_C$, $41_D$, $41_E$, storing the integrated signal intensities $Q_{A1}$, $Q_{B1}$, $Q_{C1}$, $Q_{D1}$, $Q_1$ corresponding to the signal pulses $P_{A1}$, $P_{B1}$, $P_{C1}$, $P_{D1}$, $P_1$ respectively, are provided. Also, a buffer memory $40_T$ storing the pulse interval $T_0$ corresponding to the signal pulse $P_0$, and a buffer memory $41_T$ storing the pulse interval $T_1$ corresponding to the signal pulse $P_1$, are provided.

Also, in place of the energy computing unit 11, the energy computing units $11_A$, $11_B$, $11_C$, $11_D$, $11_E$ corresponding to the signal pulses $P_{A0}$, $P_{B0}$, $P_{C0}$, $P_{D0}$, $P_0$ respectively are provided. In FIG. 24, the lookup table 12 provided in the energy calculation unit 10 is omitted.

In the above configuration, the signal pulse $P_{A0}$ is subjected to signal processing by the delay circuit $31_A$, gate integrator $32_A$, buffer memories $40_A$ and $41_A$, and energy computing unit $11_A$, and the corresponding energy $E_{A0}$ is calculated. The signal pulse $P_{B0}$ is subjected to signal processing by the delay circuit $31_B$, gate integrator $32_B$, buffer memories $40_B$ and $41_B$, and energy computing unit $11_B$, and the corresponding energy $E_{B0}$ is calculated. The signal pulse $P_{C0}$ is subjected to signal processing by the delay circuit $31_C$, gate integrator $32_C$, buffer memories $40_C$ and $41_C$, and energy computing unit $11_C$, and the corresponding energy $E_{C0}$ is calculated. And, the signal pulse $P_{D0}$ is subjected to signal processing by the delay circuit $31_D$, gate integrator $32_D$, buffer memories $40_D$ and $41_D$, and energy computing unit $11_D$ and the corresponding energy $E_{D0}$ is calculated.

The signal pulse $P_0$, obtained by adding the signal pulses $P_{A0}$, $P_{B0}$, $P_{C0}$, $P_{D0}$, is subjected to signal processing by the delay circuit $31_E$, gate integrator $32_E$, buffer memories $40_E$, $41_E$, and energy computing unit $11_E$, and the corresponding total energy $E_0$ is calculated. From these energies $E_{A0}$, $E_{B0}$, $E_{C0}$, $E_{D0}$, $E_0$, the position of the scintillator detecting the γ ray can be determined using eq. (19).

However, the X and Y coordinates obtained in this way are not necessarily proportional to the accurate X and Y coordinates of the scintillator, and in addition contain statistical noise. On the other hand, it is known that the accurate position of the scintillator is one of a plurality of positions in the matrix, and so a lookup table prepared in advance must be used to convert measured coordinate values into correct coordinate values. Also, the energy $E_0$ corresponds to the detected radiation energy, and so by performing pulse height analysis of this signal, the radiation energy can be selected.

The method and apparatus for energy measurement of this invention are not limited to the above-described embodiments, and various modifications are possible. For example, the signal pulse pileup correction method is not limited to the above-described single exponential function correction method, binomial approximation method, trinomial approximation method, or polynomial correction method, and various correction methods which employ the integrated signal intensity, pulse interval, and energy may be used, according to the details of the pulse waveform and other factors.

Also, it is preferable that the configuration of the buffer memories provided in the energy calculation unit 10 be modified appropriately according to the data to be used in pileup correction.

As has been explained in detail above, the method and apparatus for energy measurement of this invention can be used as an energy measurement method and apparatus capable of the correct and precise measurement of the energies of individual signal pulses, even at high count rates. That is, by means of an energy measurement method and apparatus which calculate energy from the integrated signal intensity and pulse interval of the signal pulse for measurement, and in addition perform pileup correction using the integrated signal intensity or the energy, or both, and the pulse interval of signal pulses input before the signal pulse to be measured, the effect of other signal pulses piled-up with the signal pulse is eliminated, so that correct and precise measurement of the energies of individual signal pulses is possible.

Such problems of signal pulse pileup occur in various types of radiation detector and in other devices. Hence the above-described method and apparatus for energy measurement can be applied to various devices and systems in which measurement of information relating to radiation energies and radiation detection positions is necessary, such as for example scintillation detectors, energy spectrometers, radiation position detectors, gamma cameras, SPECT systems, and PET systems, and can ensure that the energy resolution and image resolution of such systems and devices remain satisfactory even at high count rates.

What is claimed is:

1. An energy measurement apparatus which integrates the signal intensity of the pulse waveform of a signal pulse for measurement to measure the energy of said signal pulse, comprising:

trigger signal generation means, which accepts as input one of the branched signal pulses of the inputted signal pulse and generates a trigger signal corresponding to said signal pulse;

gate signal generation means, which accepts as input said trigger signal from said trigger signal generation means, and based on said trigger signal, generates a gate signal to indicate integration of the signal intensity;

pulse interval measurement means, which accepts as input said trigger signal from said trigger signal generation means, and measures the time interval from said trigger signal until the next trigger signal as the pulse interval of said signal pulse;

delay means, which accepts as input another of said inputted branched signal pulses, and delays said signal pulse by a prescribed delay time;

gate integration means, which accepts as input said signal pulse delayed by said delay means and said gate signal from said gate signal generation means, and integrates the signal intensity of said signal pulse for a prescribed integration time which is set based on the indication of said gate signal, to acquire the integrated signal intensity; and, energy calculation means, which calculates the energy corresponding to the total integrated intensity of said signal pulse from said integrated signal intensity acquired by said gate integration means and from said pulse interval measured by said pulse interval measurement means; and wherein said energy calculation means performs pileup correction of uncorrected energy calculated from said integrated signal intensity and said pulse interval of said signal pulse for measurement, using at least one of said integrated signal intensity or said energy, and said pulse interval, of the signal pulse inputted prior to the signal pulse for measurement to calculate said corrected energy.

2. The energy measurement apparatus according to claim 1, wherein said energy calculation means uses coefficients $A(T)$ and $B(T)$, determined based on said pulse interval T, to calculate said energy $E_0$ of the signal pulse $P_0$ inputted at time $t_0$ from the integrated signal intensity $Q_0$ and pulse interval $T_0$ of said signal pulse $P_0$, and from the integrated signal intensity $Q_1$ and pulse interval $T_1$ of the signal pulse $P_1$ inputted in succession at time $-t_1(-t_1<t_0)$, according to the equation:

$$E_0 = Q_0 \cdot A(T_0) - Q_1 \cdot B(T_1).$$

3. The energy measurement apparatus according to claim 2, wherein said energy calculation means has a lookup table for each of said coefficients used in calculating said energy and determined based on said pulse interval T, said lookup tables being created from the values of said coefficients which are determined in advance for a plurality of said pulse interval values.

4. The energy measurement apparatus according to claim 1, wherein said energy calculation means uses coefficients $D_0(T)$, $D_1(T)$ and $D_2(T)$, determined based on said pulse interval T, to calculate said energy $E_0$ of the signal pulse $P_0$ inputted at time $t_0$, from the integrated signal intensity $Q_0$ and pulse interval $T_0$ of said signal pulse $P_0$, from the energy $E_1$ and pulse interval $T_1$ of the signal pulse $P_1$ inputted in succession at time $-t_j$ ($-t_j<-t_{j-1}$), and from the integrated signal intensity $Q_2$ and pulse interval $T_2$ of the signal pulse $P_2$ inputted in succession at time $-t_2$ ($-t_2<-t_1$), according to the equation:

$$E_0 = Q_0 \cdot D_0(T_0) - E_1 \cdot D_1(T_1) - Q_2 \cdot D_2(T_2).$$

5. The energy measurement apparatus according to claim 4, wherein said energy calculation means has a lookup table for each of said coefficients used in calculating said energy and determined based on said pulse interval T, said lookup tables being created from the values of said coefficients which are determined in advance for a plurality of said pulse interval values.

6. The energy measurement apparatus according to claim 1, wherein said energy calculation means has energy computing means which performs computations to calculate said energy, including computations for said pileup correction; a first buffer memory, which stores said integrated signal intensity and said pulse interval for said signal pulse for measurement; and a second buffer memory, which stores at least one of said integrated signal intensity or said energy, and said pulse interval, for the signal pulse inputted prior to the signal pulse for measurement.

7. The energy measurement apparatus according to claim 1, wherein said energy calculation means sets J (where J is an integer greater than or equal to 1) as the number of signal pulses, from among the signal pulses inputted prior to said signal pulse for measurement, for use in said pileup correction, and uses the coefficients $C_0(T)$ and $C_j(T)(j=1, \ldots, J)$, determined based on said pulse interval T, to calculate said energy $E_0$ of the signal pulse $P_0$ inputted at time $t_0$ from the integrated signal intensity $Q_0$ and pulse interval $T_0$ of said signal pulse $P_0$, and from the energies $E_j$ and pulse intervals $T_j$ of the J signal pulses $P_j$ inputted in succession at times $t_j$ ($t_j<t_{j-1}$), according to the equation:

$$E_0 = Q_0 \cdot C_0(T_0) - \sum_{j=1}^{J} E_j \cdot C_j(T_j).$$

8. The energy measurement apparatus according to claim 7, wherein said energy calculation means has a lookup table for each of said coefficients used in calculating said energy and determined based on said pulse interval T, said lookup tables being created from the values of said coefficients which are determined in advance for a plurality of said pulse interval values.

9. The energy measurement apparatus according to claim 1, further comprising pulse shape discrimination means which discriminates the pulse shape of said signal pulse among a plurality of types of pulse shapes based on shape discrimination conditions set in advance; and wherein said energy calculation means calculates said energy using a calculation method corresponding to the type of said pulse shape, discriminated by said pulse shape discrimination means.

10. The energy measurement apparatus according to claim 1, wherein said integration time over which the signal intensity of said signal pulse is integrated in said gate integration means is set, for each of said signal pulses for measurement, as an effective integration time T', which is the shorter time among a maximum integration time $T_{max}$, set in advance, and the times $T-T_r$ obtained by subtracting the reset time $T_r$ of said gate integration means from said pulse interval T, such that:

$$T'=\min(T_{max}, T-T_r).$$

11. An energy measurement method, in which signal intensity of a pulse waveform of a signal pulse for measurement is integrated and energy of said signal pulse is measured, comprising:

a pulse interval acquisition step, in which the pulse interval of an inputted signal pulse, which is the time interval from said signal pulse to the next signal pulse, is acquired;

an integrated intensity acquisition step, in which signal intensity of said signal pulse is integrated over a prescribed integration time set so as to correspond to said pulse interval, to acquire an integrated signal intensity; and an energy calculation step, in which energy corresponding to the total integrated intensity of said signal pulse is calculated from said integrated signal intensity acquired in said integrated intensity acquisition step, and from said pulse interval acquired in said pulse interval acquisition step;

wherein, in said energy calculation step, pileup correction of uncorrected energy calculated from said integrated signal intensity and said pulse interval for said signal pulse to be measured is performed, using at least one of said integrated signal intensity or said energy, and said pulse interval, for the signal pulse inputted prior to the signal pulse for measurement to calculate said corrected energy; and wherein, in said energy calculation step, coefficients A(T) and B(T), which are determined based on said pulse interval T, are used to calculate said energy $E_0$ of the signal pulse $P_0$ inputted at time $t_0$ from the integrated signal intensity $Q_0$ and pulse interval $T_0$ of said signal pulse $P_0$, and from the integrated signal intensity $Q_1$ and pulse interval $T_1$ of the signal pulse $P_1$ inputted in succession at time $-t_1(-t_1<t_0)$, according to the equation:

$$E_0 = Q_0 \cdot A(T_0) - Q_1 \cdot B(T_1).$$

12. The energy measurement method according to claim 11, wherein a lookup table, created from the values of said coefficients which are determined in advance for a plurality of said pulse interval values, is used in said energy calculation step for each of said coefficients used in calculating said energy and determined based on said pulse interval T.

13. The energy measurement method according to claim 11, further comprising a pulse shape discrimination step in which the pulse shape of said signal pulse is discriminated among a plurality of pulse shape types, based on shape discrimination conditions set in advance; and wherein, in said energy calculation step, said energy is calculated using a calculation method corresponding to the type of said pulse shape discriminated in said pulse shape discrimination step.

14. An energy measurement method, in which signal intensity of a pulse waveform of a signal pulse for measurement is integrated and energy of said signal pulse is measured, comprising:

a pulse interval acquisition step, in which the pulse interval of an inputted signal pulse, which is the time interval from said signal pulse to the next signal pulse, is acquired;

an integrated intensity acquisition step, in which signal intensity of said signal pulse is integrated over a prescribed integration time set so as to correspond to said pulse interval, to acquire an integrated signal intensity; and, an energy calculation step, in which energy corresponding to the total integrated intensity of said signal pulse is calculated from said integrated signal intensity acquired in said integrated intensity acquisition step, and from said pulse interval acquired in said pulse interval acquisition step;

wherein, in said energy calculation step, pileup correction of uncorrected energy calculated from said integrated signal intensity and said pulse interval for said signal pulse to be measured is performed, using at least one of said integrated signal intensity or said energy, and said pulse interval, for the signal pulse inputted prior to the signal pulse for measurement to calculate said corrected energy; and wherein, in said energy calculation step, the number of signal pulses used in said pileup correction, from among the signal pulses inputted prior to said signal pulse for measurement, is set as J (where J is an integer greater than or equal to 1), and coefficients $C_0(T)$ and $C_j(T)(j=1, \ldots, J)$, which are determined based on said pulse interval T, are used to calculate said energy $E_0$ of the signal pulse $P_0$ inputted at time $t_0$ from the integrated signal intensity $Q_0$ and pulse interval $T_0$ of said signal pulse $P_0$, and from the energies $E_j$ and pulse intervals $T_j$ of the J signal pulses $P_j$ inputted in succession at times $t_j(-t_j<t_j-1)$, according to the equation:

$$E_0 = Q_0 \cdot C_0(T_0) - \sum_{j=1}^{J} E_j \cdot C_j(T_j).$$

15. The energy measurement method according to claim 14, wherein a lookup table, created from the values of said coefficients which are determined in advance for a plurality of said pulse interval values, is used in said energy calculation step for each of said coefficients used in calculating said energy and determined based on said pulse interval T.

16. The energy measurement method according to claim 14, further comprising a pulse shape discrimination step in which the pulse shape of said signal pulse is discriminated among a plurality of pulse shape types, based on shape discrimination conditions set in advance; and wherein, in said energy calculation step, said energy is calculated using a calculation method corresponding to the type of said pulse shape discriminated in said pulse shape discrimination step.

17. An energy measurement method, in which signal intensity of a pulse waveform of a signal pulse for measurement is integrated and energy of said signal pulse is measured, comprising:

a pulse interval acquisition step, in which the pulse interval of an inputted signal pulse, which is the time interval from said signal pulse to the next signal pulse, is acquired;

an integrated intensity acquisition step, in which signal intensity of said signal pulse is integrated over a prescribed integration time set so as to correspond to said pulse interval, to acquire an integrated signal intensity; and, an energy calculation step, in which energy corresponding to the total integrated intensity of said signal pulse is calculated from said integrated signal intensity acquired in said integrated intensity acquisition step, and from said pulse interval acquired in said pulse interval acquisition step;

wherein, in said energy calculation step, pileup correction of uncorrected energy calculated from said integrated signal intensity and said pulse interval for said signal pulse to be measured is performed, using at least one of said integrated signal intensity or said energy, and said pulse interval, for the signal pulse inputted prior to the signal pulse for measurement to calculate said corrected energy; and wherein, in said energy calculation step, coefficients $D_0(T)$, $D_1(T)$ and $D_2(T)$, which are determined based on said pulse interval T, are used to calculate said energy $E_0$ of the signal pulse $P_0$ inputted at time $t_0$, from the integrated signal intensity $Q_0$ and pulse interval $T_0$ of said signal pulse $P_0$, from the energy $E_1$ and pulse interval $T_1$ of the signal pulse $P_1$ inputted in succession at time $-t_1 (-t_1 < -t_0)$, and from the integrated signal intensity $Q_2$ and pulse interval $T_2$ of the signal pulse $P_2$ inputted in succession at time $-t_2$ $(-t_2 < t_1)$, according to the equation:

$$E_0 = Q_0 \cdot D_0(T_0) - E_1 \cdot D_1(T_1) - Q_2 \cdot D_2(T_2).$$

18. The energy measurement method according to claim 17, wherein a lookup table, created from the values of said coefficients which are determined in advance for a plurality of said pulse interval values, is used in said energy calculation step for each of said coefficients used in calculating said energy and determined based on said pulse interval T.

19. The energy measurement method according to claim 17, further comprising a pulse shape discrimination step in which the pulse shape of said signal pulse is discriminated among a plurality of pulse shape types, based on shape discrimination conditions set in advance; and wherein, in said energy calculation step, said energy is calculated using a calculation method corresponding to the type of said pulse shape discriminated in said pulse shape discrimination step.

* * * * *